(12) United States Patent  
Matsumoto et al.

(10) Patent No.: US 6,173,122 B1  
(45) Date of Patent: Jan. 9, 2001

(54) DISTANCE MEASURING APPARATUS AND METHOD

(75) Inventors: Yukihiro Matsumoto, Kawaguchi; Osamu Harada, Kawasaki, both of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/208,656

(22) Filed: Dec. 10, 1998

(30) Foreign Application Priority Data

Dec. 16, 1997 (JP) .................................................. 9-363328  
Dec. 25, 1997 (JP) .................................................. 9-357737  
Jan. 29, 1998 (JP) ................................................. 10-017141  
Jan. 30, 1998 (JP) ................................................. 10-019118

(51) Int. Cl.$^7$ .................................................. G03B 13/36  
(52) U.S. Cl. ........................................... 396/104; 396/106  
(58) Field of Search .................................. 396/128, 106, 396/104, 103, 96; 250/201.4, 201.8; 356/3.13, 3.14, 3.08, 3.03

(56) References Cited

U.S. PATENT DOCUMENTS 4,792,668 * 12/1988 Akashi et al. ..................... 250/201.8  
4,862,204 * 8/1989 Ishida et al. ......................... 396/128

* cited by examiner

*Primary Examiner*—W. B. Perkey  
(74) *Attorney, Agent, or Firm*—Morgan & Finnegan, LLP

(57) ABSTRACT

When performing distance measuring operation in an active mode, a charging time is compared to a predetermined period, and if the charging time is shorter than the predetermined period, then it is determined that the object is at a short distance, whereas, if the charging time is longer than the predetermined period, then it is determined that the object is in the distance. Since the positions where images of an object are formed on sensors depend upon the distance to the object, in other words, the phase difference between the images of the object depends upon the distance to the object, when the object is in the distance, the correlation operation is performed in a shift range corresponding to the long distance, whereas, when the object is at a short distance, the correlation operation is omitted in a shift range corresponding to the long distance and the correlation operation is performed in a range corresponding to a short distance.

61 Claims, 31 Drawing Sheets

| PIXEL NUMBER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| IMAGE INFORMATION AFTER QUANTIZATION | 0 | 1 | 2 | 3 | 4 | 3 | 2 | 1 | 0 | 4 | 0 | 4 | 0 | 1 | 0 |

SIGNAL PATTERN A

| PIXEL NUMBER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| IMAGE INFORMATION AFTER QUANTIZATION | 1 | 4 | 0 | 1 | 2 | 3 | 4 | 3 | 2 | 1 | 0 | 0 | 0 | 0 | 0 |

SIGNAL PATTERN B

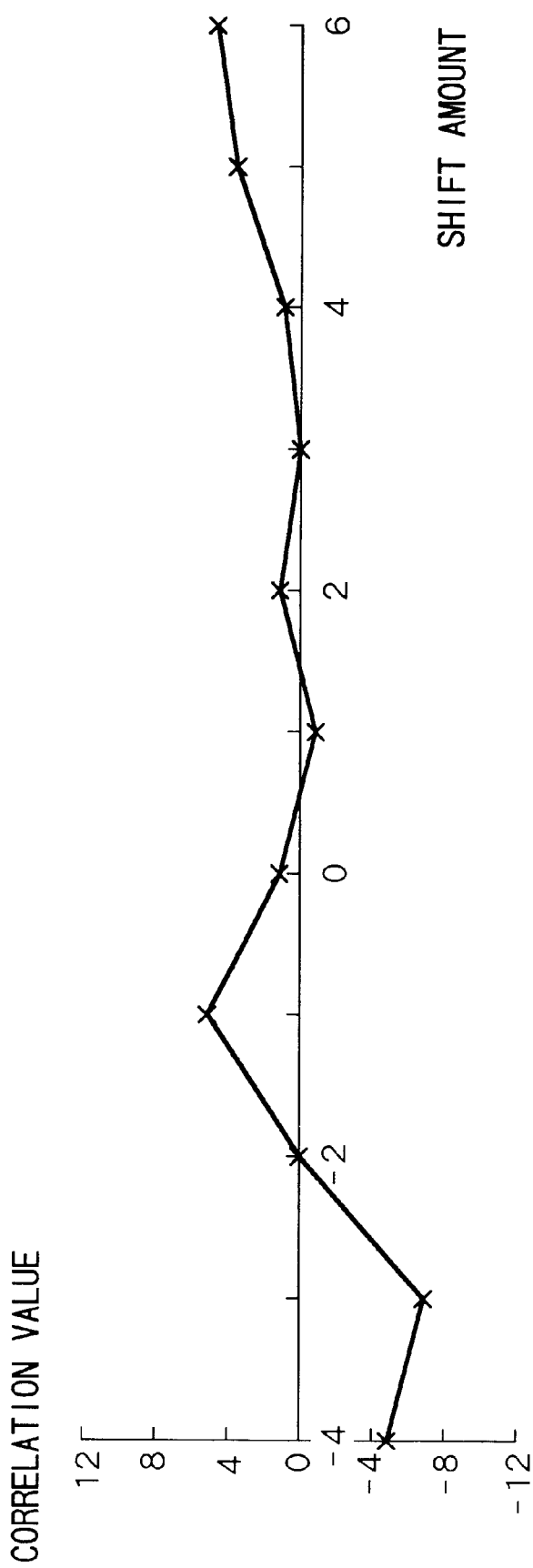

DISTANCE MEASURING APPARATUS AND METHOD

BACKGROUND OF THE INVENTION

The present invention relates to a distance measuring apparatus and method for measuring the distance to an object to be measured and, for example, a distance measuring apparatus and method suitably applied to an automatic focusing mechanism of a camera.

Conventionally, a distance measuring device which performs trigonometrical measurement by projecting a light spot onto an object to be measured and receiving light reflected by the object using a position detection means such as a position sensitive detector (PSD) or the like is known. Further, another distance measuring device which circulates an accumulated charge using a ring-shaped charge transfer device, such as CCD, to integrate reflected light of ON/OFF-projected light spots and skims a predetermined amount of charges of external light components other than the light spot has been proposed by Japanese Patent Publication No. 5-22843 and Japanese Patent Application Laid-Open No. 8-233571. The distance measuring device of this type can keep accumulating charges while circulating the accumulated charge if the level of the accumulated charge is not high enough, thereby it is possible to obtain signals of good S/N ratio.

Further, a method for measuring a shift amount of two images of an object of interest received by two ring-shaped CCDs having the above configuration, and measuring a distance to the object on the basis of the measured shift amount is proposed in Japanese Patent Application Laid-Open No. 9-105623. The aforesaid distance measuring devices are often used in an automatic focusing mechanism of a camera.

First, the Japanese Patent Publication No. 5-22843 is explained below.

FIG. 21 is a diagram illustrating a configuration of a light-receiving unit used in a distance measuring apparatus.

Note, in FIG. 21, a photoelectric conversion (photo-receiving) device 520 of a light-receiving unit 500 is represented by three photoelectric conversion devices X, Y and Z, to simplify the explanation.

The light-receiving unit 500 operates in two different modes, namely, an active mode and a passive mode.

The active mode is to project light onto an object 515 to be measured, the distance to which is to be measured, by turning on and off a light emit element (here, infrared light-emitting diode; IRED) 514 to emit light pulses, receive light reflected by the object using the photoelectric conversion devices X, Y and Z, and store the charges. Whereas, the passive mode is to receive external light reflected by the object without turning on the IRED 514 using the photoelectric conversion devices X, Y and Z, and store the charges.

The distance measuring apparatus is of a hybrid-type capable of performing distance measuring operation both in the active mode and in the passive mode, and, when a reliable measurement result is not obtained in the active mode, then the distance is measured once again in the passive mode.

Further, the light-receiving unit 500 has a linear CCD 524 which includes ON-pixels 522x, 522y, and 522z and OFF-pixels 523x, 523y, and 523z, respectively corresponding to the photoelectric conversion devices X, Y and Z, and a ring-shaped CCD 521 which includes a plurality of ON-pixels and OFF-pixels.

Therefore, the charges obtained as a result of photoelectric conversion in the photoelectric conversion devices X, Y and Z are respectively transferred to the corresponding ON-pixels and OFF-pixels of the linear CCD 524 and stored, thereafter, transferred to the ring-shaped CCD 521.

Next, timing of charge transfer operation in the light-receiving unit 500 is explained with reference to FIG. 22.

Referring to FIG. 22, the IRED 514 turns on and off in synchronization with the ON/OFF (High/Low) of a charging signal in the active mode, and the IRED 514 is kept off independent of the ON/OFF of the charging signal in the passive mode.

First, charges obtained in the photoelectric conversion devices X, Y and Z while the charging signal is ON (i.e., High level) are transferred to the ON-pixels 522x, 522y, and 522z while an ON-pixel transfer signal is ON (i.e., High level).

Further, charges obtained in the photoelectric conversion devices X, Y and Z while the charging signal is OFF (i.e., Low level) are transferred to the OFF-pixels 523x, 523y, and 523z while an OFF-pixel transfer signal is ON (i.e., High level).

In this manner, charges due to projected light reflected by the object and external light are stored in the ON-pixels 522x, 522y, and 522z, while charges due to external light are stored in the OFF-pixels 523x, 523y, and 523z in the active mode.

After the charges obtained in the photoelectric conversion devices X, Y and Z are transferred to the ON-pixels 522x, 522y, and 522z and the OFF-pixels 523x, 523y, and 523z, the charges are transferred to the ring-shaped CCD 521.

To transfer the charges to the ring-shaped CCD 521, a ring transfer signal is used. The ring transfer signal becomes High so that charges from the same pixel of the linear CCD 524 are always transferred to the same pixel of the ring-shaped CCD. Accordingly, charges outputted from the ON-pixel 522x, corresponding to the photoelectric conversion element X obtained during the charging signal is ON, for example, are accumulated.

In FIG. 22, the numerals 1, 2, 3, and so on, indicate the number of circulation. The number of circulation indicates the number of times charges are transferred to the ring-shaped CCD 521.

More specifically, in the first circulation, charges are transferred to the ring-shaped CCD 521 once, as shown in FIG. 23A, and the charges obtained in one charging operation are stored. In the second circulation, charges obtained in two charging operations are accumulated, as shown in FIG. 23B, and in the third circulation, charges are transferred to the ring-shaped CCD 521 three times; in other words, three charging operations are performed and charges obtained in the three charging operations are accumulated in the respective pixels, as shown in FIG. 23C.

When the charges accumulated in the ring-shaped CCD 521 do not reach a predetermined level (level in which distance measurement can be performed on the basis of the charges), i.e., incoming light to the photoelectric conversion devices X, Y and Z is low, the number of circulation, i.e., the number of charging operation, is increased, and the charges are sequentially transferred to the ring-shaped CCD 521 and accumulated until charges are accumulated to the necessary (predetermined) level. In this manner, it is possible to obtain charges of good S/N ratio.

Whereas, in a case where an amount of charge in the ring-shaped 521 succeeds a predetermined level within a predetermined times of circulation, i.e., in a case where incoming light to the photoelectric conversion devices X, Y and Z is high, it is necessary to adjust the amounts of charges to be stored in the pixels of the linear CCD 524 in one charging operation in order to prevent the pixels from being saturated.

As for adjusting the amounts of charges, there are a method of adjusting a charging period by controlling an electrical shutter function, and a method for controlling a frequency for operating the photoelectric conversion devices X, Y and Z, thereby controlling a charging period.

More specifically, in the method of adjusting the charge amounts by controlling the electrical shutter function, if a reference charging period is 100%, then the charging period is reduced to 70%, 50%, and so on, when the object 515 is bright.

Further, in the method of adjusting the charge amount by controlling the frequency for operating the photoelectric conversion devices X, Y and Z, if any of the ON-pixels 522$x$, 522$y$, and 522$z$ and the OFF-pixels 523$x$, 523$y$, and 523$z$ is saturated when the photoelectric conversion devices X, Y and Z are operated at 1 MHz, then by operating the photoelectric conversion devices X, Y and Z in the doubled frequency, namely at 2 MHz, it is possible to halve the duration of the charging period without changing other charging conditions.

By adjusting the amount of charge as described above, the pixels of the linear CCD 524 are prevented from being saturated.

FIG. 24 is a flowchart showing distance measuring operation when the aforesaid distance measuring apparatus is applied to an automatic focusing (AF) function of a camera which deals with a variety of objects ranging from an object of high reflectance at a short distance to an object of low reflectance in the distance.

First, when the AF function is activated, the active mode is set in step S602; thereby distance measuring operation is performed in the active mode, first.

Next, whether the current mode is the active mode or the passive mode is determined in step S603.

If it is determined that the current mode is the active mode in step S603, then an operation frequency fc for operating the photoelectric conversion devices X, Y and Z is set to 500 kHz as an initial value in step S604. Whereas, if it is determined that the current mode is the passive mode in step S603, then the operation frequency fc is set to 1 MHz as an initial value in step S605.

After setting the initial operation frequency either in step S604 or S605, then ICG (Integration Clear Gate) mode is executed in step S606.

The ICG mode is to determine charging conditions (e.g., setting of electronic shutter and operation frequency) so that any of the OFF-pixels 523$x$, 523$y$, and 523$z$ is not saturated by external light while accumulating charges.

Next in step S607, whether or not the external light is too bright to prevent the OFF-pixels 523$x$, 523$y$, and 523$z$ from being saturated under the charging conditions determined in step S606 (saturation due to external light) is judged.

For example, if the set value of the electronic shutter is the minimum and any of the accumulated charges exceeds a predetermined level within the predetermined number of circulation, then it is determined that the charging period can not be shortened any further by controlling the electronic shutter, and that saturation due to external light occurred.

If it is determined that saturation due to external light occurred in step S607, the process proceeds to step S612, which will be explained later.

Whereas, if it is determined in step S607 that saturation due to external light did not occur, then the integration mode is executed in step S608. In the integration mode, charges are accumulated in the ring-shaped CCD 521.

A period elapsed while accumulating charges is known from the number of circulation and the operation frequency fc stored in advance.

After finishing accumulating charges in the ring-shaped CCD 521, whether or not any of the ON-pixels 522$x$, 522$y$, and 522$z$ is saturated is determined in step S609. This determination is performed in the same manner as described in step S607.

If it is determined that any of the ON-pixels 522$x$, 522$y$, and 522$z$ is saturated, then the process proceeds to step S612 which will be explained later.

Whereas, if it is determined in step S609 that none of the ON-pixels 522$x$, 522$y$, and 522$z$ is saturated, then read-out mode is executed in step S610. The read-out mode is to read out charges accumulated in the ring-shaped CCD 521.

The charges read out from the ring-shaped CCD 521 in the read-out mode are provided to a CPU (not shown), for instance, and distance measuring operation for obtaining the distance to the object 515 is performed in step S611. The distance measuring operation performed in step S611 is a correlation operation, and two images, having parallax, are shifted so as to coincide with each other, then the shifted amount is obtained. The distance to the object is obtained on the basis of the shifted amount. This correlation operation is based on the phenomena that correlation relationship between the two images changes depending upon the distance to the object. Thereafter, the process proceeds to step 612.

In step S612, whether the current mode (distance measuring mode) is the active mode or the passive mode is checked.

If it is determined as the active mode in step S612, then the process proceeds to step S614 where whether the distance measuring operation has completed normally (OK) or with any trouble (NG) is determined. In a case where any of the ON-pixels 522$x$, 522$y$, and 522$z$ and the OFF-pixels 523$x$, 523$y$, and 523$z$ is determined as saturated in step S607 with external light or in step S609, then the distance measuring operation is considered as NG, and the passive mode is set in step S615. Thereafter, the process returns to step S603, and the processes subsequent to step S603 are performed again.

Whereas, if it is determined in step S614 that the distance measuring operation has completed normally, then the result of distance measuring operation obtained in step S611 is adopted, and the process is completed. Further, if it is determined in step S612 that the current mode is the passive move, then the result of distance measuring operation obtained in step S611 is adopted, and the process is completed.

Next, the principle of the correlation operation performed in step S611 is briefly explained with reference to FIG. 25A to FIG. 27.

When the signals of the two images are signals of right and left images obtained from two circulating-type shift registers 500 arranged on the image surface (referred to as "right signal pattern" and "left signal pattern", respectively, hereinafter) and an object is in the distance, the right signal pattern and the left signal pattern appear at about the same position as shown in FIG. 25A. As the position of the object approaches to the measuring position, the phase difference between the right signal pattern and the left signal pattern increases as shown in FIGS. 25B and 25C.

When two signal patterns as shown in FIG. 26A are obtained, conjunction between the two signal patterns with respect to shifted amount when at least one of the two signal patterns is shifted is as shown in FIG. 26B.

FIG. 27 is a flowchart briefly showing correlation operation. When the correlation operation for distance measuring operation starts in step S901, then a shift amount, Ms, of shifting a signal pattern is set to a start shift amount in step S902, and an end shift amount, Me, is set in step S903. Next in step S904, necessary initialization of RAM is performed. Note, Smin (will be explained later) is initialized to a sufficiently large value in step S904.

Next in step S905, the right signal pattern is shifted to the left by Ms, and a conjunction S between the right signal pattern and the left signal pattern is calculated in step S906. When the conjunction obtained in step S906 is plotted with respect to the shift amount, as shown in FIG. 26B, it is known that a shift amount corresponding to the minimum value of the conjunction represents a position where the right signal pattern coincides with the left signal pattern. Therefore, in step S907, comparison for holding the minimum value, Smin, of the conjunction between the right and left signal patterns is performed. If the conjunction S calculated in step S906 is smaller than the current minimum value Smin (Yes in step S907), then the process proceeds to step S908 where the value of Smin is replaced by the value of S. Further, the shift amount Ms corresponding to the conjunction S is stored as a variable M in step S909, and the process proceeds to step S910.

Whereas, if it is determined in step S907 that the conjunction S obtained in step S906 is equal to or greater than Smin, then the process directly proceeds to step S910.

In step S910, the shift amount Ms is increased by 1, and whether or not the increased shift amount Ms exceeds the end shift amount Me is checked in step S911. If Ms does not exceed Me, then the process returns to step S905 and the same processes as described above are performed. Whereas, if Ms exceeds Me, then the process proceeds to step S912 and the correlation operation is completed. As for the result of the correlation operation, the distance to the object is known from the variable M (the shift amount where the conjunction between the right and left signal patterns is minimum) stored in step S909.

In the aforesaid correlation calculation performed for distance measuring operation in order to deal with a variety of objects ranging from an object at a short distance to an object in the distance, since the shift amount is small when the object is at a long distance, whereas the shift amount is large when the object is at a short distance and there is no means for knowing the distance to the object before performing the correlation operation, it is necessary to perform correlation operation for all the shift amounts in a wide shift range. This requires considerable time.

Next, a distance measuring apparatus, as disclosed in the Japanese Patent Application Laid-Open No. 9-105623 is explained with reference to FIG. 28. The distance measuring apparatus has two photo-sensing systems which perform skimming operation, and obtains a distance to an object on the basis of a phase difference between two images obtained from the two photo-sensing systems.

Referring to FIG. 28, reference numeral 2801 denotes a first light-receiving lens for forming a first optical path; 2802, a second light-receiving lens for forming a second optical path; 2803, a projection lens for projecting a beam spot onto the object to be measured; and 2804, a light-emitting element (IRED) which is turned on/off to project beam spots. Reference numeral 2805 denotes a first sensor array as a linear array of a plurality of photoelectric conversion elements (pixels); 2806, a second sensor array as a linear array of a plurality of photoelectric conversion elements; and 2807, a first clear portion which provides an electronic shutter function of clearing charges photoelectrically converted by the respective photoelectric conversion elements of the first sensor array 2805. The first clear portion 2807 clears charges in response to pulses ICG (Integration Clear Gate). Reference numeral 2808 denotes a second clear portion which provides an electronic shutter function of clearing charges photoelectrically converted by the respective photoelectric conversion elements of the second sensor array 2806. The second clear portion 2808 clears charges in response to pulses ICG as in the first clear portion 2807.

Reference numeral 2809 denotes a first charge accumulation portion which includes ON and OFF accumulation portions (not shown) and accumulates electric charges obtained from the first sensor array 2805 synchronous with the ON and OFF periods of the light-emitting element 2804 in units of pixels in accordance with pulses ST (storage) 1 and ST2. Reference numeral 2810 denotes a second charge accumulation portion which accumulates charges obtained from the second sensor array 2806 synchronous with the ON and OFF periods of the light-emitting element 2804 in units of pixels in accordance with pulses sT1 and ST2, as in the first charge accumulation portion 2809. Reference numeral 2811 denotes a first charge transfer gate for parallelly transferring electric charges accumulated in the first charge accumulation portion 2809 to a charge transfer unit (e.g., a CCD; to be described below) in response to pulses SH. Reference numeral 2813 denotes a first charge transfer unit, which is locally or entirely constituted by a ring-shaped arrangement, and sums up charges respectively accumulated by the first charge accumulation portion 2809 during the ON and OFF periods by circulating charges. The circulating portion will be referred to as a ring CCD hereinafter. Reference numeral 2812 denotes a second charge transfer gate, which has the same arrangement as that of the first charge transfer gate 2811. Reference numeral 2814 denotes a second charge transfer unit, which has the same arrangement as that of the first charge transfer unit 2813.

Reference numeral 2815 denotes a first initialization unit, which performs initialization by resetting charges in the first charge transfer unit 2813 in response to pulses CCDCLR. Reference numeral 2816 denotes a second initialization unit, which performs initialization by resetting charges in the second charge transfer unit 2814 in response to pulses CCDCLR similarly to the first initialization unit 2815. Reference numeral 2817 denotes a first skim unit for discharging a predetermined amount of charges. Reference numeral 2818 denotes a second skim unit having the same function as that of the first skim unit 2817. Reference numeral 2819 denotes a first output unit for outputting a signal SKOS1 which is used for discriminating whether or not a predetermined amount of charges is to be discharged. The first output unit 2819 reads out the charge amount present in the first charge transfer unit 2813 in a non-destructive manner while leaving them as charges. Reference numeral 2820 denotes a second output unit for outputting a signal SKOS2 as in the first output unit 2819. Reference numeral 2821 denotes an output unit for sequentially reading out charges in the first charge transfer unit 2813 and outputting a signal OS1. Reference numeral 2822 denotes an output unit for outputting a signal OS2 in accordance with charges from the second charge transfer unit 2814 as in the output unit 2821. Reference numeral 2823 denotes a first converter which operates on the basis of the signal SKOS1; and 2824, a second converter which operates on the basis of the signal SKOS2. Reference numeral 2825 denotes a control unit including a microcomputer for making the overall control and calculations.

FIGS. 29A and 29B respectively show image information obtained by amplifying and quantizing the output signal OS1 from the first sensor array 2805 and the output signal OS2 from the second sensor array 2806 (called "signal pattern A" and "signal pattern B", respectively).

In the image information of the signal pattern A and the signal pattern B, signal levels corresponding to pixels (photoelectric conversion elements), where an image of the object is not formed, of the first and second sensor arrays 2805 and 2806 are zero. In this apparatus, the distance to the object is measured by determining the phase difference between the two image information. As for methods of determining the phase difference, there is a method in which at least one of the two image information is shifted bit by bit within a predetermined shift range, a correlation value is calculated each time the image information is shifted by a bit, and a shifted amount of the image information when the pair of image information coincide with each other is detected. The correlation value, COR, is obtained in accordance with the following equations.

$$COR = \sum_{i=0}^{cp-1} \{IA(j) \wedge IB(|cs| + j + 1)\} - \qquad (1)$$

$$\sum_{i=0}^{cp-1} \{IA(j+1) \wedge IB(|cs| + j)\} \quad \text{when } cs < 0$$

$$COR = \sum_{i=0}^{cp-1} \{IA(cs + j) \wedge IB(j+1)\} -$$

$$\sum_{i=0}^{cp-1} \{IA(cs + j + 1) \wedge IB(j)\} \quad \text{when } cs \geq 0$$

where,

IA(n): Image information of the n-th pixel of the signal pattern A

IB(n): Image information of the n-th pixel of the signal pattern B cs: Shifted amount cp: Number of pixels subjected to correlation operation The number of pixels, cp, is obtained as:

cp=(the number of pixels of the sensor) −(absolute value of a shifted amount) −(constant)

FIG. 30 is a flowchart when calculating a correlation value for each shifted amount in a case where image data as shown in FIGS. 29A and 29B are obtained.

First, in steps S701 and S702, the initialization of variables are performed. In steps S701 and S702, MA: Rate of change in correlation value of the most reliable occasion among occasions when the correlation value crosses the y=0 coordinate line, where the y axis represents correlation value JB: Absolute value of a correlation value just before crossing the y=0 coordinate line ZR: Shifted amount corresponding to the correlation value just before crossing the y=0 coordinate line LS: Correlation value with the previous shifted amount CS: Shift amount. The start shift amount is SB in bit and the end shift amount is SE in bit.

CP: Number of pixels subjected to correlation operation

NPX: Number of pixels of the sensor array

COR1: First term of the equation (1)

COR2: Second (last) term of the equation (1)

In subsequent steps S703 to S705, the start addresses PA and PB of the image information subjected to correlation operation are set in accordance with the sign (either positive or negative) of the shift amount. In the subsequent steps S706 to S715, calculation defined by the equation (1) is performed. More specifically, sums (COR1 and COR2) are obtained for a given shifted amount, and in next step S715, the correlation value COR which is the difference between the sums (COR1 and COR2) is calculated. Then, a point where the correlation value COR crosses the y=0 coordinate line (called "zero-cross point" hereinafter) is detected in subsequent steps S716 and S721. For instance, if the correlation value obtained in a given loop is greater than 0 (step S716) and the correlation value obtained in the previous loop is less than 0 (step S717), then it means that the correlation value crosses the y=0 coordinate line. Then, a rate of change DE of the correlation value at the zero cross point is calculated. In a case where a plurality of zero cross points exist, if the rate of change DE obtained in the given loop is greater than that obtained before, it means that reliability of coincidence between two image information is higher at the zero cross point in the given loop than that of the previous zero cross point; accordingly, MA is changed to DE, ZR is changed to the value which is 1 bit prior to the shift amount corresponding to the zero cross point (CS−1), and JB is changed to the absolute value of the correlation value (LS) with the previous shifted amount in step S720. Thereafter, the process proceeds to step S721 and the correlation value LS which currently stores correlation value with the previous shifted amount is changed to the correlation value COR with the current shift amount.

In order to improve resolution in phase difference between two signal patterns, MA and JB are obtained to interpolate between the correlation values between which shifted amount crosses the y=0 coordinate line. The interpolation value H is represented by $$H = JB/MA \qquad (2)$$

Whereas, if NO in step S716, S717 or S719, then the process proceeds to step S721, and the correlation value LS for storing the correlation value with the previous shifted amount is updated to the correlation value COR obtained at the current shifted amount, then the process proceeds to step S722.

The processes of steps S702 to S721 are operation to be performed for each shift amount, and these processes are repeated until the shift amount CS reaches the end shift amount SE (i.e., until SC=SE is determined in step S722).

Finally in step S724, the phase difference between the two signal patterns, PHASE, is obtained.

When the image information as shown in FIGS. 29A and 29B is obtained, by plotting correlation values obtained in accordance with the flowchart shown in FIG. 30, a graph as shown in FIG. 31 is obtained.

Referring to FIG. 31, the ordinate indicates correlation value, and the abscissa indicates relative shift amount of image information (unit: bit). In the graph, between shift amounts where the corresponding correlation values changes from a negative value to a positive value (i.e., where a zero cross point exists), there is a shift amount where the pair of the image information coincide with each other. Further, if there are more than one zero cross point, where the correlation value changes from a negative value to a positive value, the point where the rate of change in the correlation value is the greatest is determined as the point where the pair of the image information coincide. In the image information as shown in FIGS. 29A and 29B, the zero cross point exists between the shift amounts of 1 bit and 2 bits. By interpolating between the correlation values corresponding to the shift amounts of 1 bit and 2 bits, the phase difference between the pair of the image information is obtained. In this case, the phase difference is 1.5 bits, as shown in FIG. 31.

Although the phase difference is 1.5 bits as shown in FIG. 31, the shift range subjected to correlation operation does not end at 2 bits. This is because a plurality of zero cross points may exist, thus it is necessary to calculate correlation values for all the shift amounts within the predetermined shift range. Here, the shift range is the difference between the shifted amount where the last correlation operation is to be performed and the shifted amount where the first correlation operation is to be performed. The start shift amount and the end shift amount are determined on the basis of the distance B (not shown) between the optical axes of the first light-receiving lens 2801 and the second light-receiving lens 2802, shown in FIG. 28, focal length fj (not shown) of the first light-receiving lens 2801 and the second light-receiving lens 2802, pitch (not shown) of the photoelectric conversion elements of the first and second sensor arrays 2805 and 2806, and range of distance L (not shown) subjected to distance measuring operation, and the start shift amount and the end shift amount are determined on the basis of the following equations;

Start shift amount=$(B \times fj)/\{$maximum side of $L) \times p\}$

End shift amount=$(B \times fj)/\{$minimum side of $L) \times p\}$ (3)

When B=5 mm, fj=10 mm, p=0.05 mm, and L=200 ~∞, for instance, the equations (3) become, Start shift amount=$5 \times 10/(\infty \times 0.05) \approx 0$[bit]

End shift amount=$5 \times 10/(200 \times 0.05) \approx 16.7$[bits]

The end shift amount is 16.7 bits according to the above calculation, but this includes a possibility that a zero cross point may exists between the shift amounts of 16 bits and 17 bits. Accordingly, the end shift amount should be 17 bits. Therefore, under the above conditions, it is necessary to shift image information from 0 bit to 17 bits as performing correlation operation of calculating correlation values. In the flowchart shown in FIG. 30, processes of steps S702 to S723 are to be repeated 17 times.

Further, the number of pixels of a sensor array used in a distance measuring apparatus can be up to 60 in a case of high resolution sensor array; therefore, it requires considerable time for calculating correlation values. Referring to FIG. 30, when the number of pixels of a sensor array is 60, the processes of steps S707 to S714 are to be repeated 60 times in the largest case (j=0~cp, cp=NPX−|CS|−1=60−0−1), and 43 times in the least case (j=0~cp, cp=NPX−|CS|−1=60−17−1).

For completing all the processes of steps S701 to S723, if about 22,000 commands in assembler language are used in a program for the processes and if it takes 0.5 msec to process each command, then it requires about 11 msec to process all the commands. This required processing time may be short for a distance measuring apparatus which performs one-point distance measurement; however, for a distance measuring apparatus of measuring distances of multiple points, e.g., five points, it takes 55 msec to perform these processes, which increases shutter operate time lag in a camera.

The overall operation of the distance measuring apparatus as shown in FIG. 28 is briefly explained with reference to FIG. 32. FIG. 32 shows an example of brief distance measuring operation performed by the distance measuring apparatus as shown in FIG. 28. Referring to FIG. 32, first in step S801, distance measuring operation is performed in the active mode. Then in step S802, whether or not the obtained result is reliable is determined on the basis of a result of comparison between the obtained distance to a predetermined distance or whether or not it is possible to perform calculation for determining reliability, for instance. If it is determined that the obtained result is reliable (YES in step S802), then the distance measuring process is completed; whereas if the reliability of the result is low (NO in step S802), then the process proceeds to step S803 and the passive mode is set so as to perform distance measuring operation in the passive mode without using the light-emitting element 2804.

In the distance measuring operation shown in FIG. 32, the distance measurement is first performed in the active mode which is suitable for measuring the distance to an object of low contrast at a short distance. For measuring of a distance to an object in the distance, which the active mode is not suitable for measuring, the distance to the object is measured once more in the passive mode after finishing the distance measuring operation in the active mode.

In the distance measuring apparatus as described above, it is possible to perform distance measurement using an identical algorithm both in the active mode using a light-emitting device and in the passive mode without using a light-emitting device, since the distance measurement is performed with the same devices and optical system, based on correlation between two image information in the both modes.

However, when an object is in the distance where the reliability of measurement in the active mode is low, the distance measuring operation in the active mode is determined improper and the distance measuring operation is performed for the second time in the passive mode which is often affected by conditions of the object, such as contrast of the object. For instance, in a case where the object to be measured has a repeated pattern, such as an iron barred fence, since the algorithm and the correlation shift range for calculating correlation values between the two image information used both in the active mode and in the passive mode are the same in the distance measuring operation as shown in FIG. 30 performed by the aforesaid distance measuring apparatus, there is a possibility that a plurality of zero cross points may be detected and a rate of change at one of the zero cross points which corresponds to a short distance may be the largest in the passive mode. In such a case, the detection result may indicate a short distance, which is a wrong result.

Further, in the passive mode, since the external light is converted into image signals, noise due to the external light (shot noise) is ignorable; however, the measuring performance depends upon the contrast of an object to be measured, thus, even though the object has contrast, if the distance to the object is short, the contrast of the image information obtained from the light-receiving devices becomes small, which deteriorates the distance measuring performance.

Thus, correlation operation between two image information of an object at a short distance in the passive mode may provide a wrong result, as well as is waste of processing time.

Furthermore, when measuring a distance to an object in the active mode with the aforesaid conventional distance measuring apparatus, light, emitted from a light-emitting device, is projected onto the object and the reflected light from the object forms an image on the sensors, and the charging time alters depending upon the strength of the reflected light from the object. When the object is at a very short distance, the sensors may be saturated. In such a case, the distance measuring operation is determined not realizable (NG) and the passive mode is set, then distance measuring operation in the passive mode is performed. This requires extra time for completing distance measuring processing. Moreover, there is a possibility that a wrong result may be obtained.

SUMMARY OF THE INVENTION

The present invention has been made in consideration of the above situation, and has as its object to provide a distance measuring apparatus and method capable of performing high-speed distance measurement without lowering distance measuring quality by omitting unnecessary correlation operation.

According to the present invention, the foregoing object is attained by providing a distance measuring apparatus comprising: a pair of light-receiving devices for receiving light reflected by an object and converting the light into electric signals; correlation operation means for performing correlation operation on the signals obtained from the pair of light-receiving devices while shifting at least one of the signals; determination means for variably determining a shift range subjected to correlation operation performed by the correlation operation means; and distance calculation means for obtaining a distance to the object on the basis of correlation values obtained as a result of the correlation operation performed by the correlation operation means.

According to the present invention, the foregoing object is also attained by providing a distance measuring apparatus comprising: a pair of light-receiving devices for receiving light reflected by an object and converting the light into electric signals; correlation operation means for performing correlation operation on the signals obtained from the pair of light-receiving devices while shifting at least one of the signals; a light-emitting device for projecting light onto the object; mode judging means for judging whether a first mode in which distance measuring operation is performed while operating the light-emitting device or a second mode in which the distance measuring operation is performed without operating the light-emitting device is set; saturation judging means for judging whether or not saturation state due to the operation of the light-emitting device has occurred in the first mode has occurred; and distance determining means for variably determining a distance to the object as a predetermined distance when the saturation judging means judges that the saturation state has occurred.

Further, according to the present invention, the foregoing object is attained by providing a distance measuring method comprising: a step of receiving light reflected by an object and converting the light into electric signals using a pair of light-receiving devices; a correlation operation step of performing correlation operation on the signals obtained from the pair of light-receiving devices while shifting at least one of the signals; a determination step of variably determining a shift range subjected to correlation operation to be performed in the correlation operation step; and a distance calculation step of obtaining a distance to the object on the basis of correlation values obtained as a result of the correlation operation performed in the correlation operation step.

Furthermore, according to the present invention, the foregoing object is attained by providing a distance measuring method comprising: a step of receiving light reflected by an object and converting the light into electric signals using a pair of light-receiving devices; a correlation operation step of performing correlation operation on the signals obtained from the pair of light-receiving devices while shifting at least one of the signals; a determination step of variably determining a shift range subjected to correlation operation to be performed in the correlation operation step; and a distance calculation step of obtaining a distance to the object on the basis of correlation values obtained as a result of the correlation operation performed in the correlation operation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a graph for explaining an operation performed in step S120 in FIG. 12;

DETAILED DESCRIPTION OF THE PREFERRED EMBODIMENTS

Preferred embodiments of the present invention will be described in detail in accordance with the accompanying drawings.

First Embodiment

The first embodiment of the present invention will be explained.

Figure 25A:
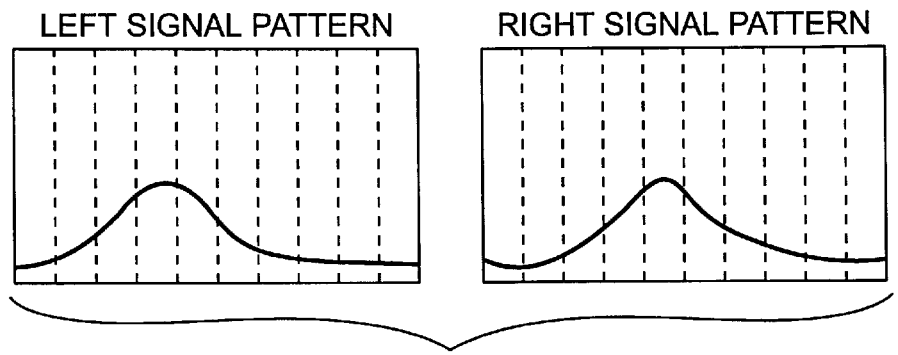
FIGS. 25A to 25C are graphs showing image signal patterns of an object in the distance, at a middle distance, and at a short distance.
Figure 25B:
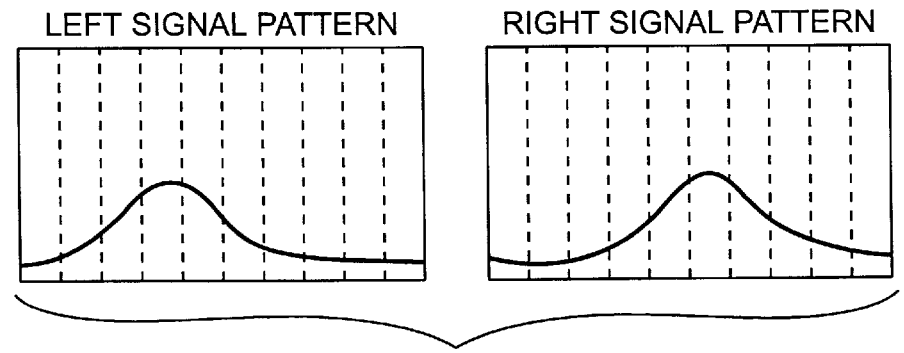
Figure 25C:
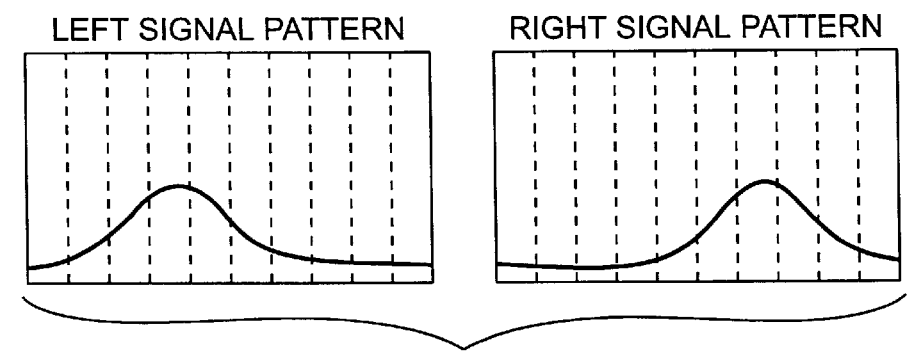
Figure 26A:
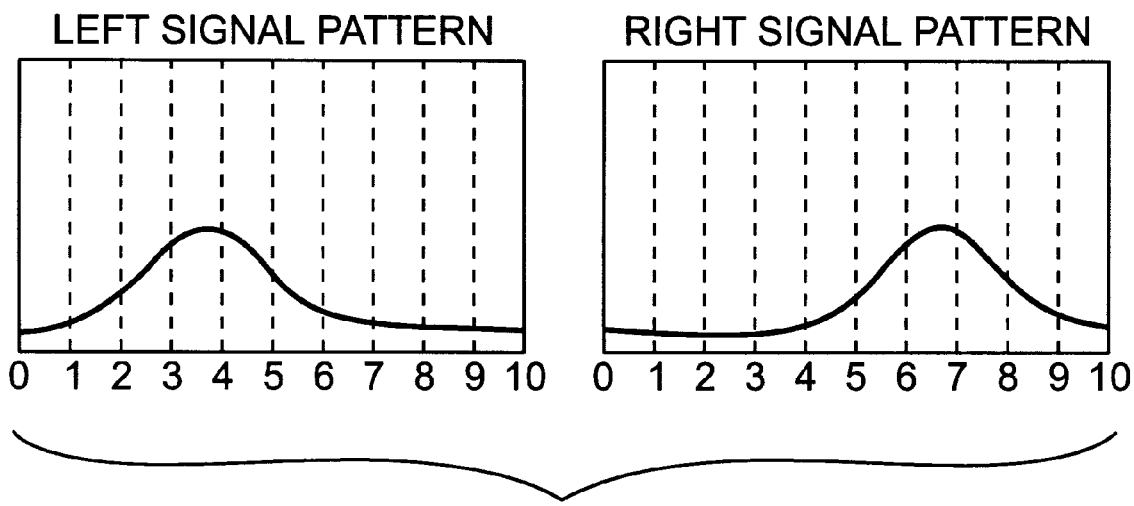
FIG. 26A shows graphs showing image signals.
Figure 26B:
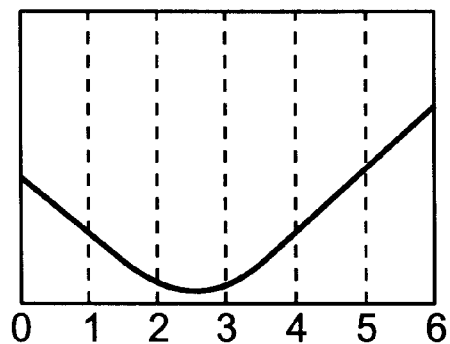
FIG. 26B is a graph showing conjunction with respect to shifted amount when one of the image signals is shifted, for explaining correlation operation.
Figure 27:
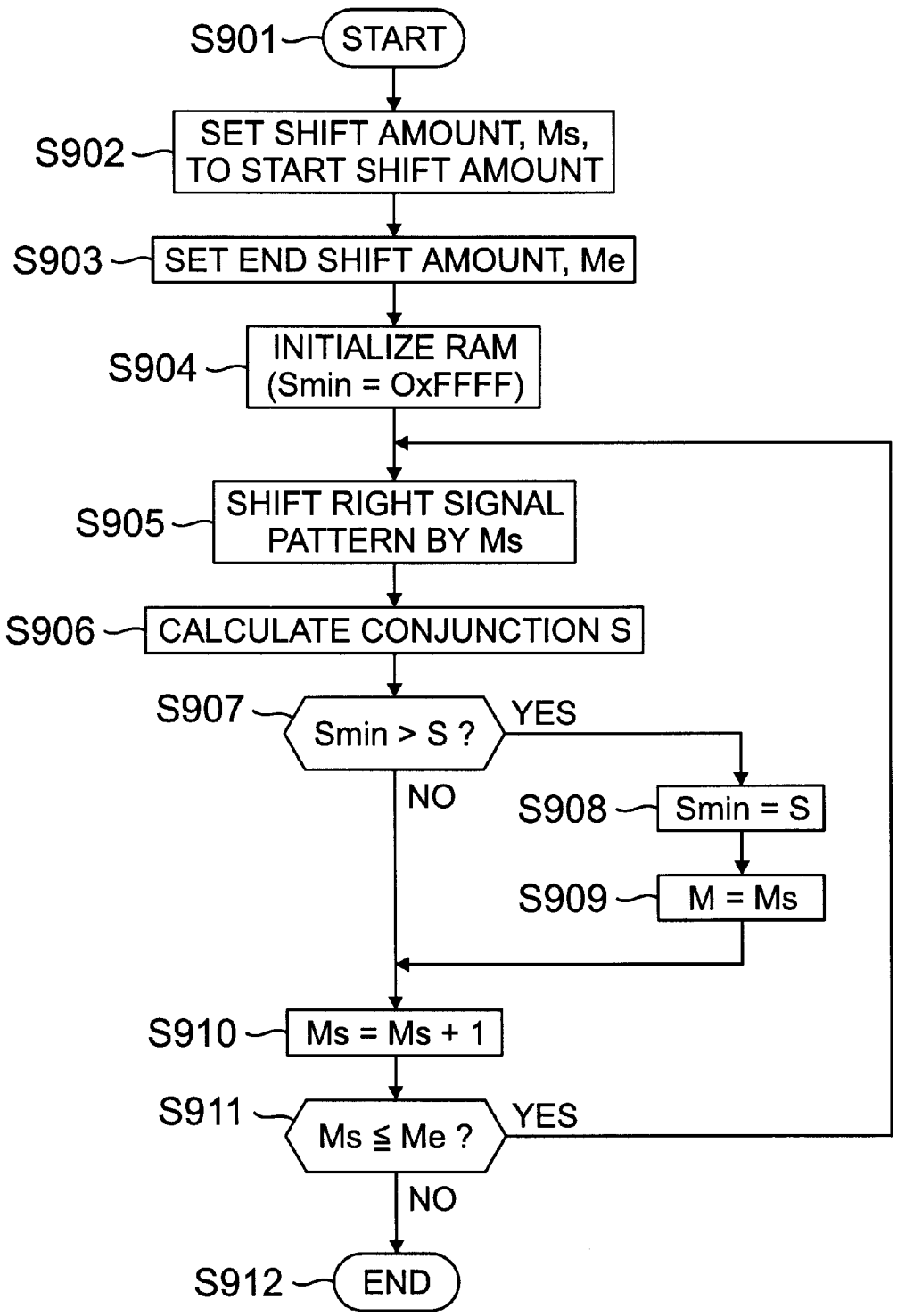
FIG. 27 is a flowchart for explaining a sequence of conventional correlation operation.

When distance measuring operation is performed in the passive mode, since external light reflected by an object forms an image on a light-receiving sensor, it is not possible to know the distance to the object on the basis of charging time which needs to accumulate charges to a predetermined level; however, in the active mode, since light is projected onto the object and the projected light reflected by the object forms an image on a light-receiving sensor, charging time depends upon the intensity of the reflected light of the projected light onto the object. More specifically, when the charging time is short, the reflected light is strong; therefore it is determined that the object is at a short distance away. In this case, the obtained signal patterns greatly offset to right and left as shown in FIG. 25C, thus the start shift amount should be set large. Whereas, when the charging time is long, the reflected light is weak; therefore, it is determined that the object is in the distance. In this case, the phase difference between the obtained signal patterns is small as shown in FIG. 25A, thus the start shift amount should be set small.

Thus, in the first embodiment, when the distance measuring operation is performed in the active mode, the distance to an object, namely, whether the object is near or far from the measuring point (i.e., from the distance measuring apparatus), is roughly determined on the basis of the charging time, and the start shift amount and the end shift amount are set depending upon the determined result, thereby reducing time for completing the distance measuring operation.

Figure 1:
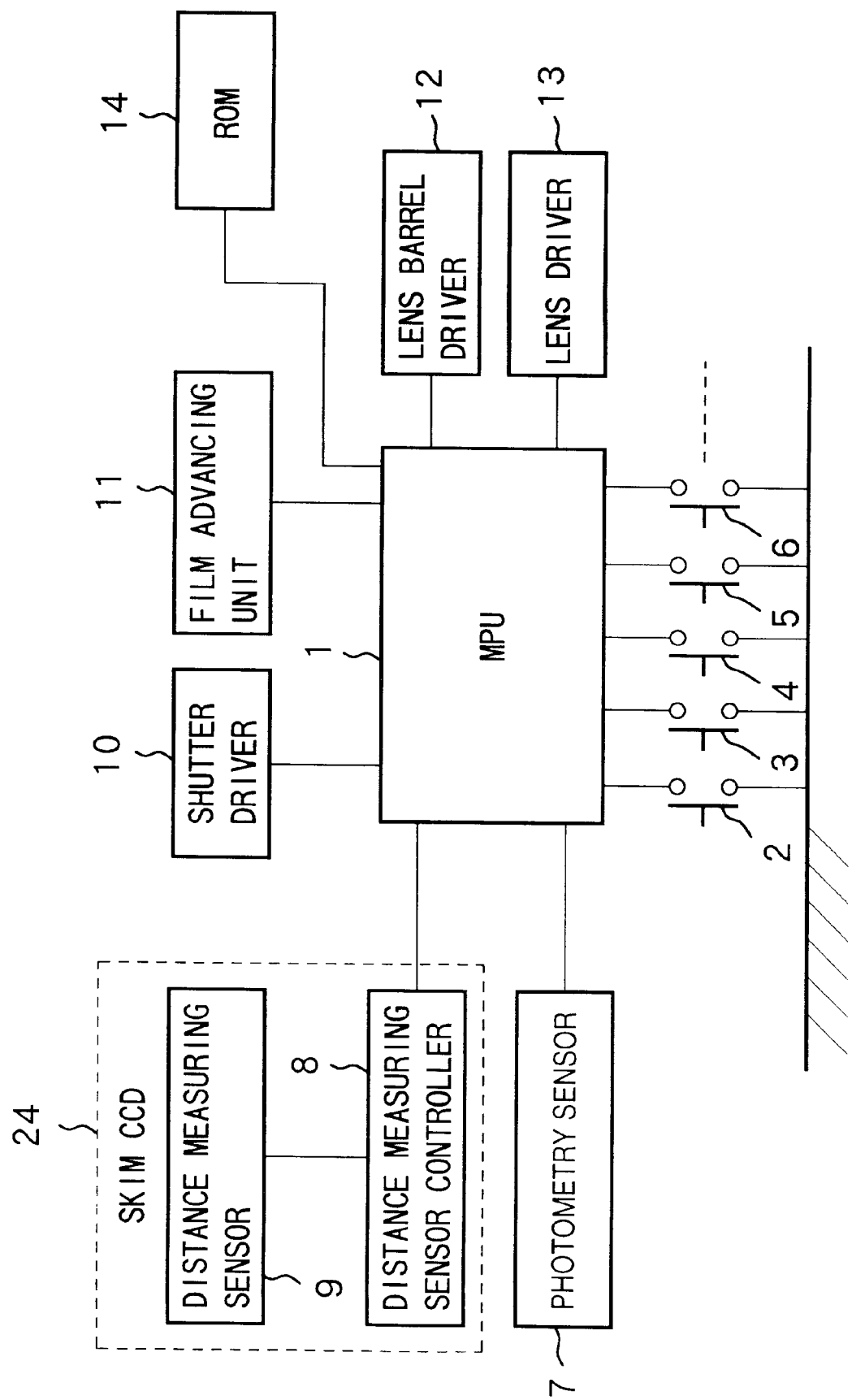
FIG. 1 is a block diagram illustrating a configuration of a camera to which a distance measuring apparatus of the present invention is applied according to a first embodiment of the present invention.

FIG. 1 is a block diagram illustrating a configuration of a camera to which a distance measuring apparatus of the present invention is applied.

In FIG. 1, reference numeral 1 denotes an MPU for controlling overall operation, which includes a microcomputer having RAM, an operation unit and a storage unit (not shown). Reference numeral 2 denotes a main switch for turning on/off the camera; 3, a tele-switch for moving a lens barrel (not shown) to a telephoto side when the camera is on; 4, a wide-switch for moving the lens barrel to a wide-angle side when the camera is on; and 5, a preparation switch for triggering preparation for image sensing operation when the camera is on. When the preparation switch 5 is turned on, the preparation for image sensing operation, such as photometry and distance measuring operation, is performed. After the preparation is completed, the camera waits for a shutter switch to be turned on. Reference numeral 6 denotes the shutter switch. When the shutter switch 6 is turned on and when the preparation switch is on, it triggers a series of operation, from focus control on the basis of the result of the distance measuring operation to an advancement of the film by a frame.

Figure 4:
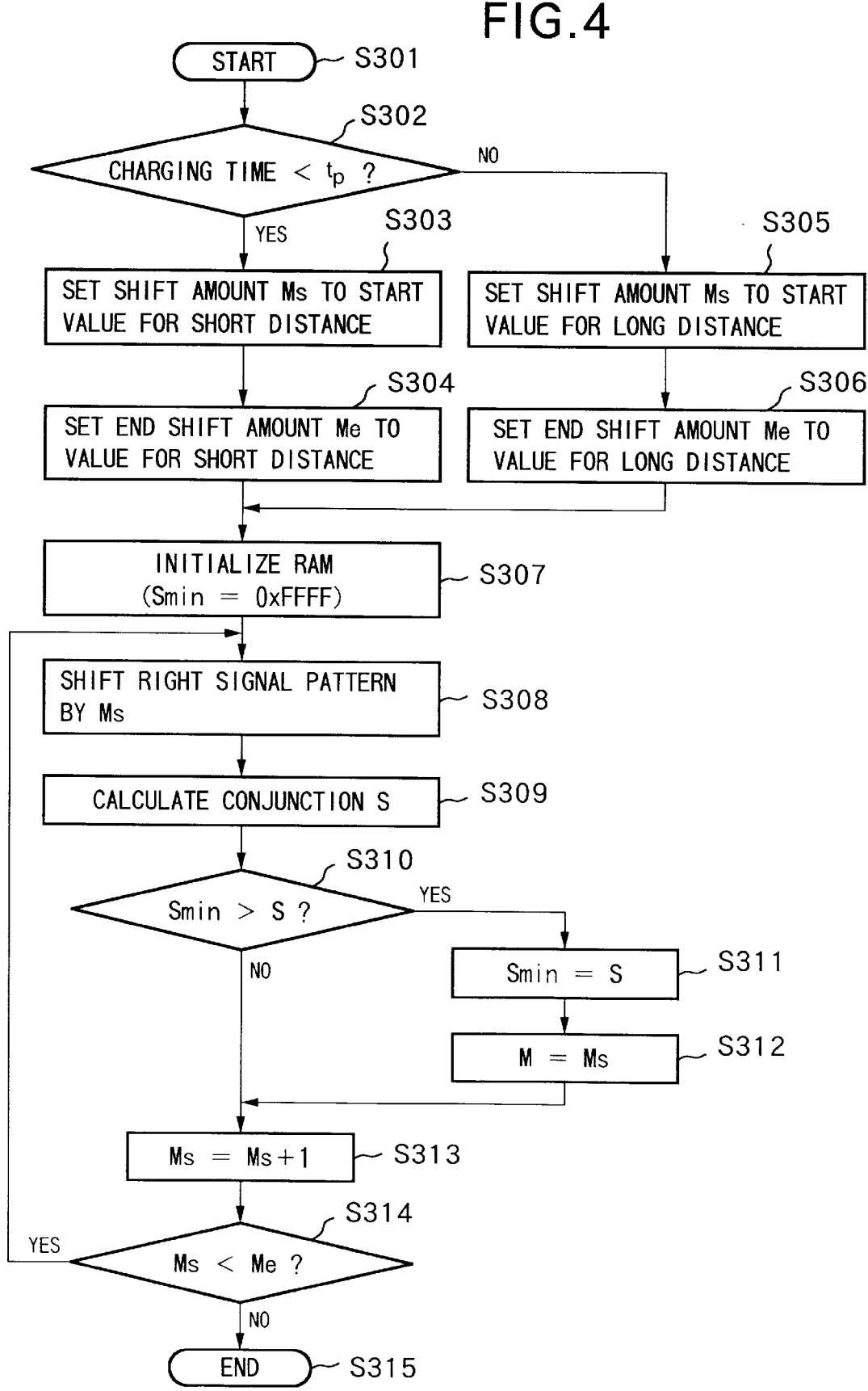
FIG. 4 is a flowchart for explaining a sequence of correlation operation according to the first embodiment of the present invention.

Reference numeral 7 denotes a photometry sensor for measuring external luminance for image sensing operation. The photometry sensor 7 includes a temperature sensor (not shown), and outputs a signal corresponding to the external luminance, measured by the temperature sensor, to the MPU 1. Reference numeral 24 denotes a skim CCD, which includes a distance measuring sensor controller 8 and a distance measuring sensor 9 for measuring distance to an object for image sensing operation. Reference numeral 10 denotes a shutter driver for controlling exposure time by a shutter on the basis of the photometry result obtained by the photometry sensor 7. Reference numeral 11 denotes a film advancing unit for advancing the film (not shown) a frame after exposing a frame; 12, a lens barrel driver for moving the lens barrel for changing the focal distance in response to ON operation of the tele-switch 3 and the wide-switch 4; 13, a lens driver for moving the lens (not shown) for focusing on an object on the basis of the result of distance measurement; and 14, ROM as a storage medium of the present invention, which stores a program including the processes on the basis of the flowchart shown in FIG. 4 executed by the MPU 1. The processes in FIG. 4 are explained later. As for the storage medium, semiconductor memory, an optical disk, a magneto-optical disk, and a magnetic medium, for instance, may be used.

Figure 2:
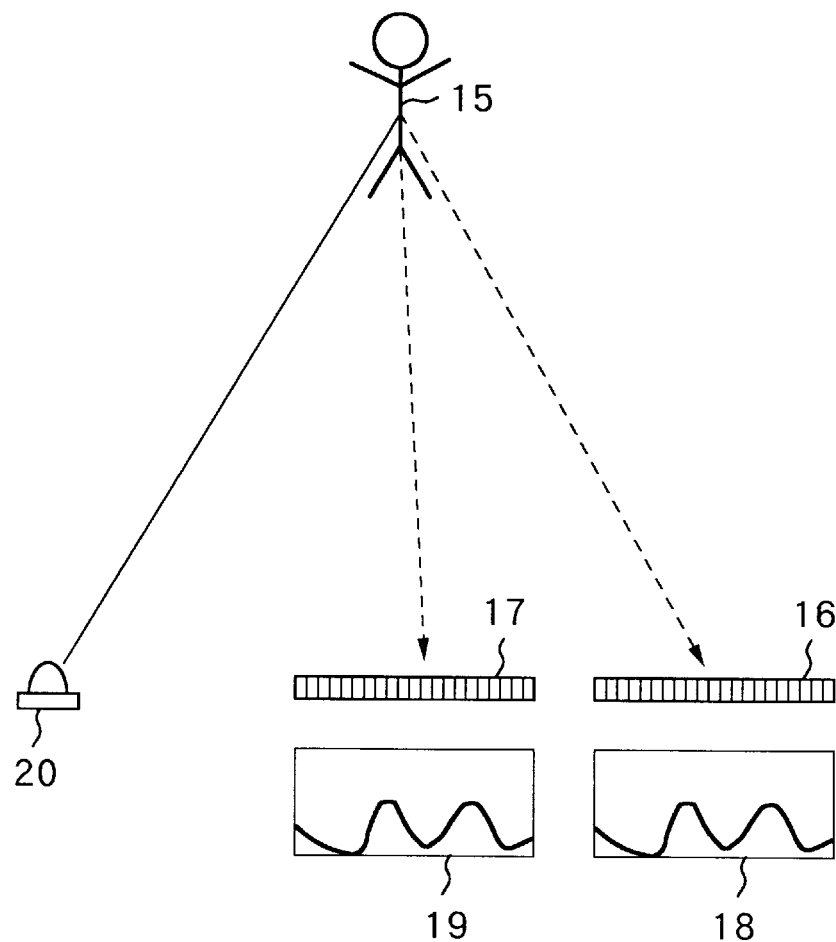
FIG. 2 is a diagram showing a concept of distance measurement.

FIG. 2 is a diagram showing a concept of distance measurement of the present invention.

Referring to FIG. 2, an infrared light-emitting diode (IRED) 20 projects light onto an object 15. A light-receiving sensor includes an A sensor 16, and a B sensor 17 which are arranged at a predetermined distance from each other. The A sensor 16 and the B sensor 17 respectively have a plurality of photoelectric conversion elements which receive the light, emitted by the IRED 14 and reflected by the object 15, or external light reflected by the object 15, and generate electric charges in response to an amount of the received light. In FIG. 2, an example of the outputs from the A sensor 16 and the B sensor 17 are referred to by 18 and 19, respectively. The output from the A sensor 16, denoted by reference numeral 18, is called "right signal pattern" and the output from the B sensor 17, denoted by reference numeral 19, is called "left signal pattern" hereinafter. The distance measuring method used in the first embodiment is a phase-difference detection method for detecting the distance to the object using a principle of trigonometry on the basis of the two signal patterns from the sensors.

Figure 3:
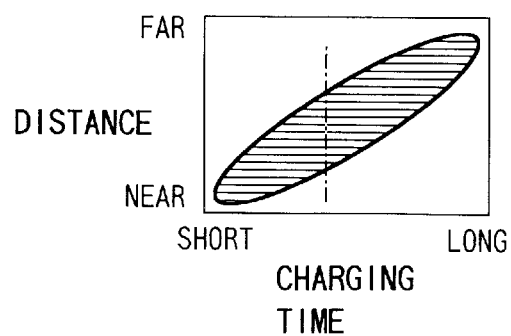
FIG. 3 is a graph showing relationship between distance to an object and charging time which needs to accumulate charges to a predetermined level.

FIG. 3 is a graph showing relationship between distance to an object and charging time which needs to accumulate charges to a predetermined level. The charging time varies depending upon reflectance of the object; however, if the object is at a short distance, the charging time is generally short, whereas if the object is at a far distance, the charging time is long, on the whole, as seen from FIG. 3.

Figure 24:
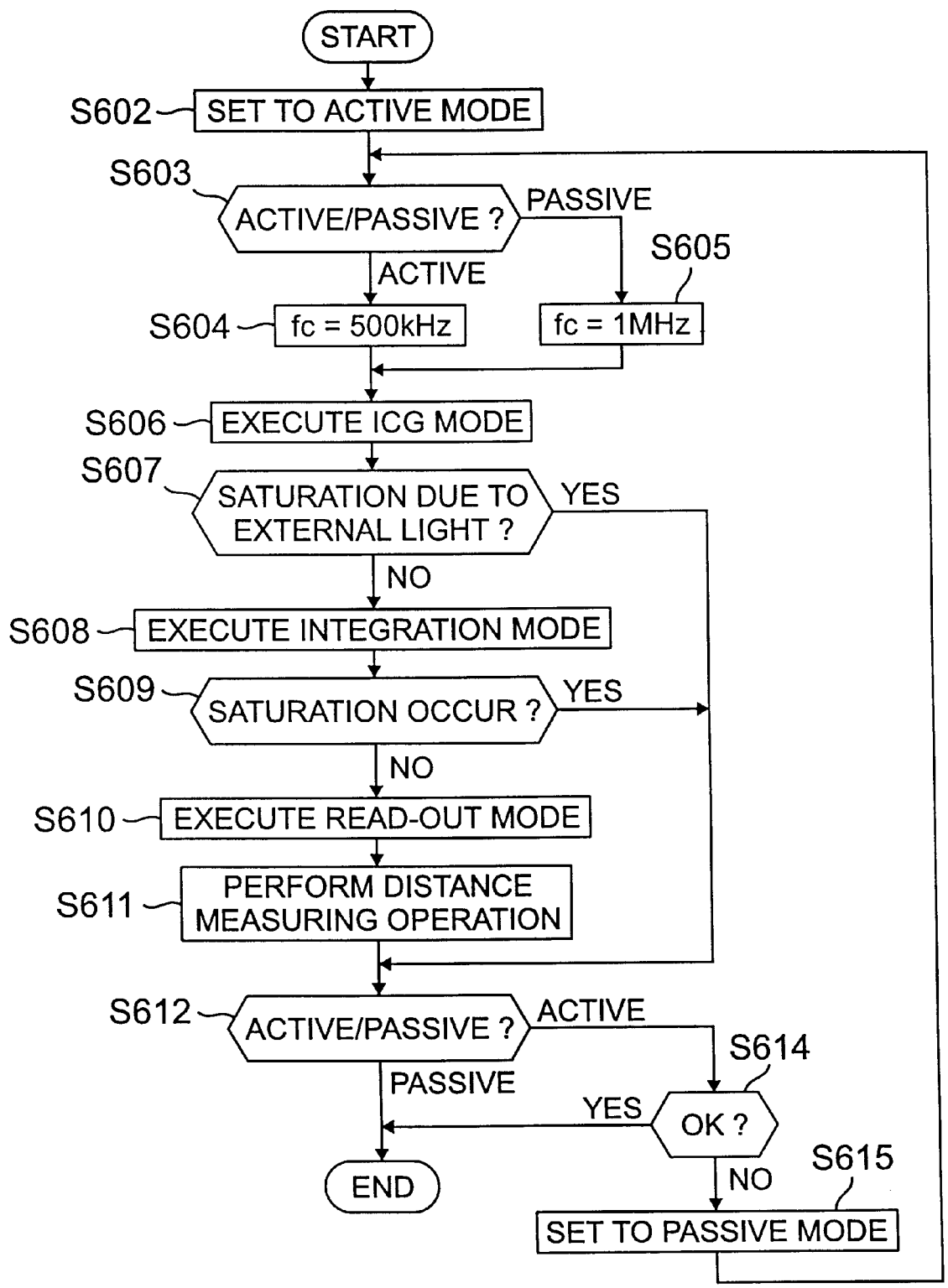
FIG. 24 is a flowchart for explaining a conventional distance measuring operation.

FIG. 4 is a flowchart for explaining a sequence of correlation operation in a distance measuring operation as that performed in an automatic focusing sequence explained above with reference to FIG. 24. Referring to FIG. 4, correlation operation for the distance measuring operation starts in step S301, then in step S302, charging time needed to accumulate charges to a predetermined level is compared to a predetermined time $t_p$. If the charging time is shorter than the predetermined time $t_p$, then a shift amount, Ms, is set to such a predetermined start value that does not include shift amounts corresponding to infinite and long distances in step S303, and an end shift amount, Me, is set to a value so as to include shift amounts corresponding to short distances in step S304. Whereas, if the charging time is longer than the predetermined time $t_p$, then a shift amount, Ms, is set to a predetermined start value so as to include shift amounts corresponding to infinite and long distances in step S305, and an end shift amount, Me, is set to such a value that does not include shift amounts corresponding to short distances in step S306. Next in step S307, necessary initialization of RAM is performed. Note, Smin, which represents a minimum conjunction value, is initialized to a sufficiently large value in step S307. In step S308, the right signal pattern 18 is shifted to the left by the shift amount Ms, and a conjunction S between the right signal pattern 18 and the left signal pattern 19 is calculated in step S309.

In step S310, comparison for holding the minimum value, Smin, of the conjunction between the right and left signal patterns 18 and 19 is performed. The minimum value Smin of the conjunction at a time when performing the compari-son and the conjunction S calculated in step S309 are compared. If the conjunction S is smaller than the minimum value Smin (Yes in step S310), then the process proceeds to step S311 where the value of Smin is replaced by the value of S, and the current shift amount Ms is stored as M In step S312. Thereafter, the process proceeds to step S313.

Whereas, if it is determined in step S310 that the conjunction S is equal to or greater than the minimum value Smin, then the process directly proceeds to step S313.

In step S313, the shift amount Ms is increased by 1, and whether or not the increased shift amount Ms exceeds the end shift amount Me is checked in step S314. If Ms does not exceed Me, then the process returns to step S308 and the same processes as described above are performed. Whereas, if Ms exceeds Me, then the process proceeds to step S315 and the correlation operation is completed. As for the result of the correlation operation, the distance to the object is known from the variable M (the shift amount where the conjunction between the right and left signal patterns is minimum) stored in step S312.

According to the first embodiment as described above, the distance to an object is roughly known from charging time needed to accumulate charges to a predetermined level, and the shift range, determined by start shift amount and end shift amount, subjected to distance measuring operation, such as correlation operation, is changed on the basis of the rough distance to the object. Accordingly, it is possible to omit unnecessary correlation operation, thereby reducing time for measuring a distance without lowering distance measurement quality.

Note, a single predetermined time $t_p$ is used in the comparison performed in step S302 and whether the object is at a relatively short distance or at a relatively long distance is roughly determined; however, it is possible to determine whether the object is at a short distance, at a middle range, or at a long distance by comparing the charging time to a plurality of predetermined times, for instance, and the start shift amount and the end shift amount may be determined on the basis of the determination result.

Further, in step S308 in FIG. 4, the right signal pattern 18 is shifted to the left, however, the present invention is not limited to this, and either right, left, or both signal patterns may be shifted to the direction that the right and left signal patterns approach each other. For instance, the left signal pattern 19 may be shifted to the right.

Further, in the first embodiment, the A sensor 16 and B sensor 17 are arranged so that phase difference between object images formed on the A sensor 16 and the B sensor 17 is about zero when the object is at an infinite distance; however, the present invention is not limited to this, and the A sensor 16 may be arranged so that, when the object is at an infinite distance, an image of the object is formed at about the center portion of the B sensor 17 whereas an image of the object is formed at the left portion of the A sensor 16, for instance. In such a case, when the object is at an infinite distance, the right signal pattern 18 should be shifted to the right, and, when the object is at a short distance, the right signal pattern 18 should be shifted to the left. Thus, the start shift amount and the end shift amount should be determined in accordance with the arrangement of the sensors.

Second Embodiment

Next, the second embodiment of the present invention will be explained in detail with reference to the accompanying drawings.

Figure 5:
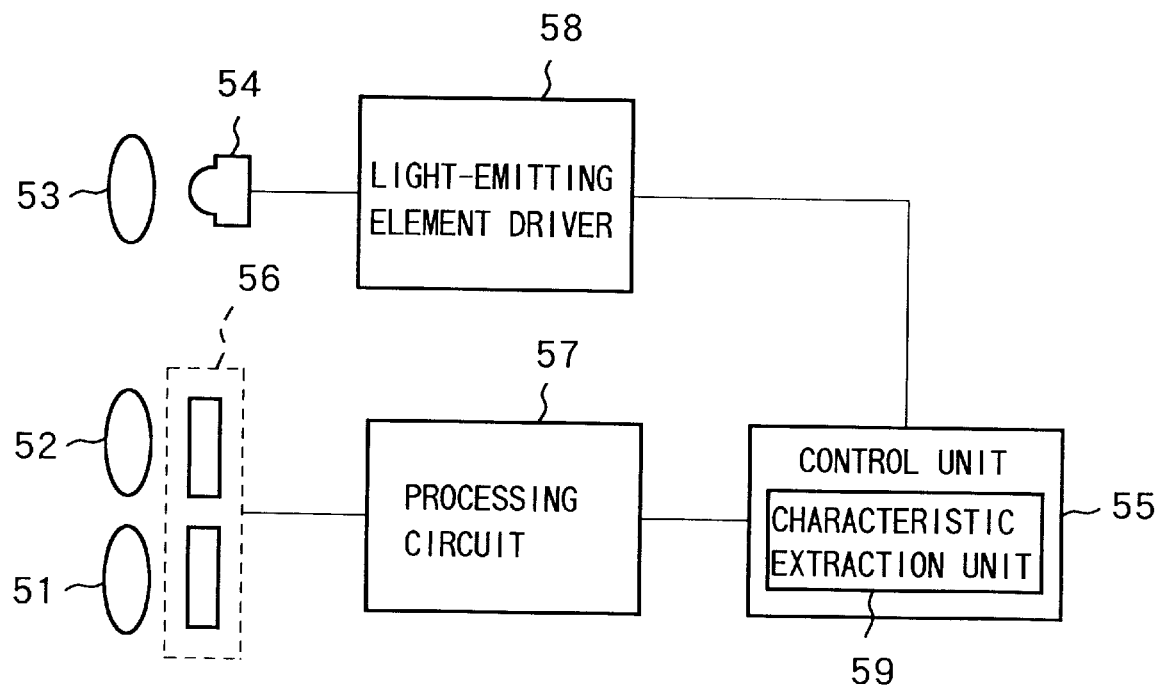
FIG. 5 is a diagram briefly showing a configuration of a distance measuring apparatus according to a second embodiment of the present invention.

FIG. 5 is a diagram briefly showing a configuration of a distance measuring apparatus according to the second embodiment of the present invention.

Figure 28:
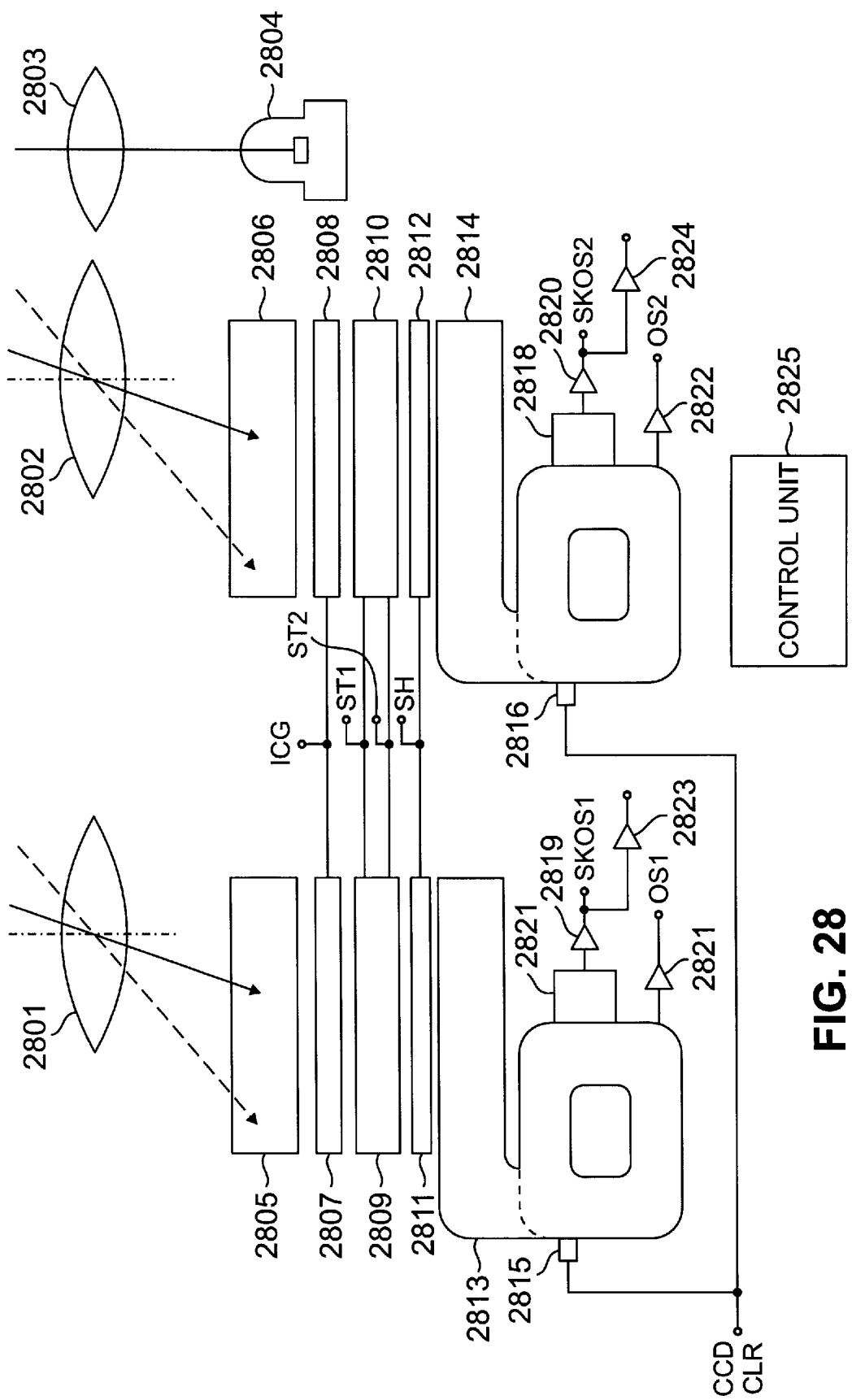
FIG. 28 is a diagram illustrating a configuration of a distance measuring apparatus having CCDs which perform skimming operation.

In FIG. 5, reference numeral 51 denotes a first light-receiving lens for forming a first optical path; 52, a second light-receiving lens for forming a second optical path; 53, a projection lens for projecting a beam spot onto an object to be measured; 54, a light-emitting element (IRED) which is turned on/off to project beam spots; and 58, a light-emitting element driver for driving the IRED 54 in response to an instruction from a control unit 55 which will be explained later. Reference numeral 56 denotes a CCD, having a pair of sensor arrays, which performs skimming operation. Since the detailed configuration of the CCD 56 is the same as that explained with reference to FIG. 28; therefore, the explanation of it is omitted. Reference numeral 59 denotes a characteristic extraction unit for detecting rough centers of image data of a pair of image information and obtaining a rough phase difference between the two images. The characteristic extraction unit 59 is included in the control unit 55. Reference numeral 57 denotes a processing circuit, which amplifies and applies A/D conversion to the pair of image information output from the CCD 56; and 55, the control unit including a microcomputer for controlling the overall operation and performing calculations, memory for temporarily storing a variety of data, and the characteristic extraction unit 59.

Next, an operation of the distance measuring apparatus having the aforesaid configuration is explained with reference to a flowchart shown in FIG. 6.

Figure 6:
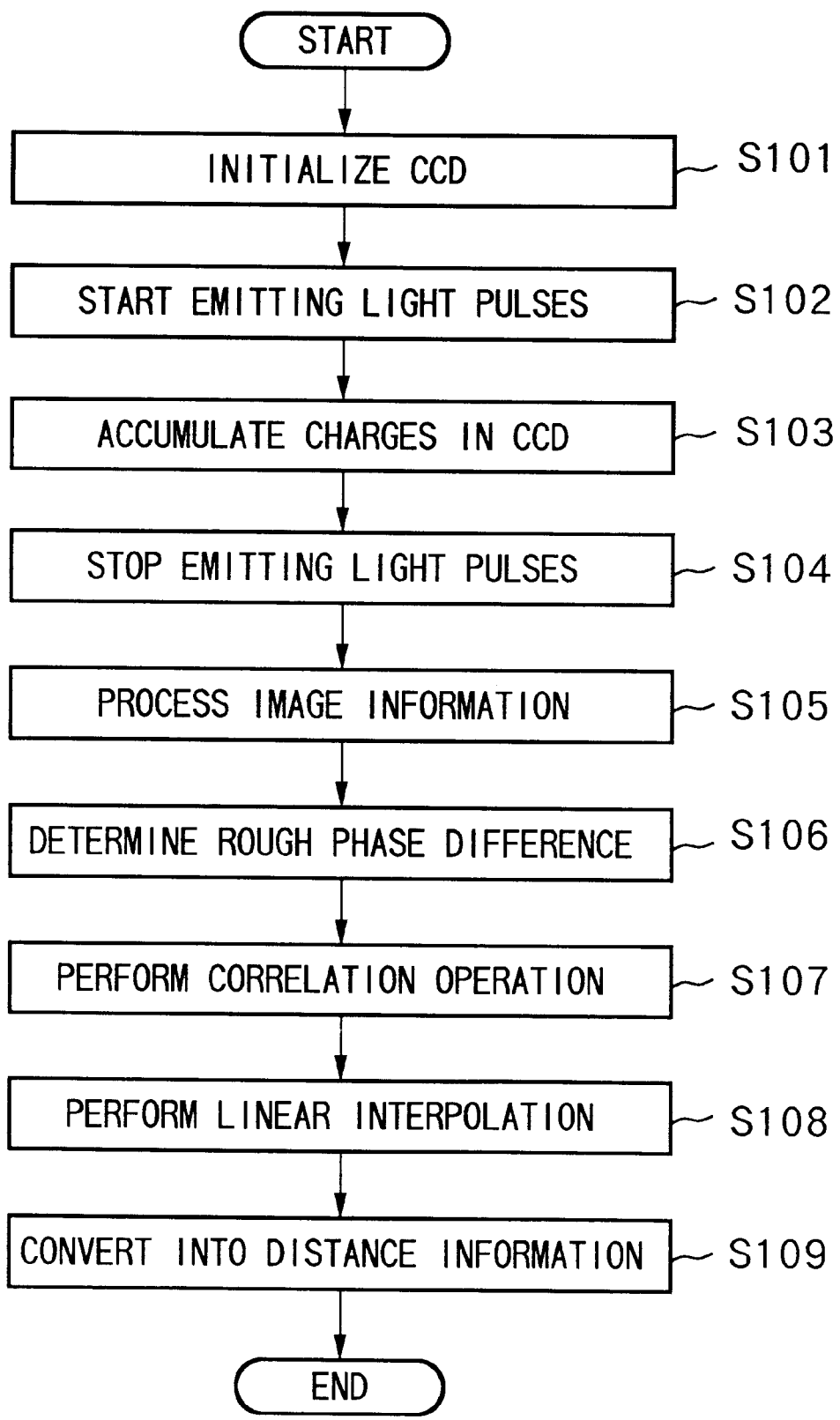
FIG. 6 is a flowchart showing an operation of the distance measuring apparatus according to the second embodiment of the present invention.

First, initialization is performed for a predetermined period in order to clear all the residual charges within the CCD 56 in step S101 (FIG. 6). After the initialization, the light-emitting element driver 58 drives the IRED 54 to start emitting light pulses in step S102, and accumulation of charges in the CCD 56 is performed for a predetermined period or until an output value from the CCD 56 reaches a predetermined level in step S103. After charges are accumulated until either one of the above conditions is satisfied, the accumulation of charges in the CCD 56 is finished as well as the IRED 54 is controlled to stop emitting light pulses in step S104. The pair of image information stored in the CCD 56 are amplified and applied with A/D conversion in the processing circuit 57, and stored in storage medium (not shown) in the control unit 55 in step S105. One of the pair of the image information is referred to as "signal pattern A", and the other image information is referred to as "signal pattern B" hereinafter.

Next, using the characteristic extraction unit 59, a position corresponding to a rough center of the total of the values of the respective pixels, obtained as a result of A/D conversion, of each signal pattern and a rough phase difference between two signal patterns is obtained in step S106.

Figure 7:
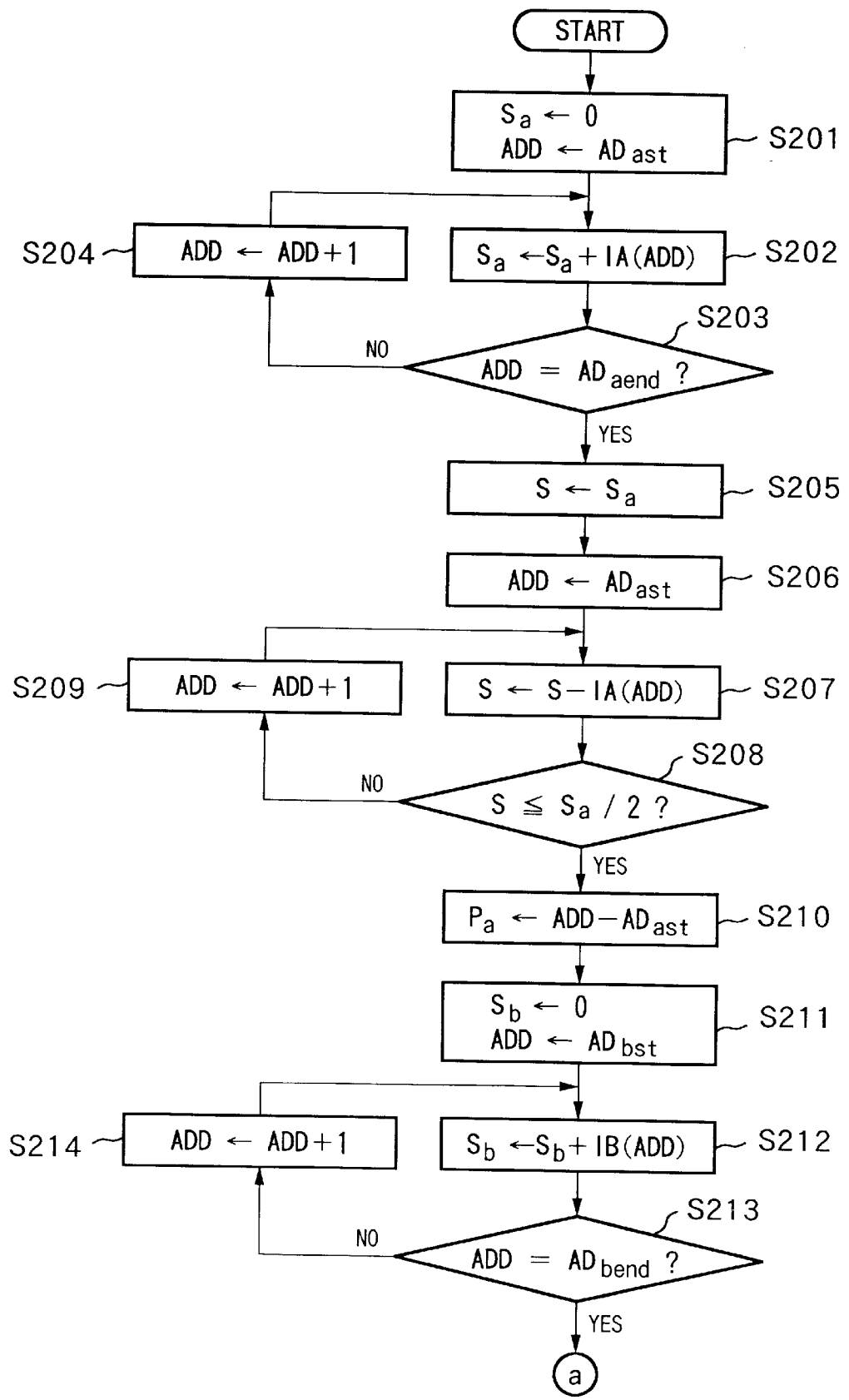
FIG. 7 is a flowchart showing an operation performed in step S106 in FIG. 6.
Figure 8:
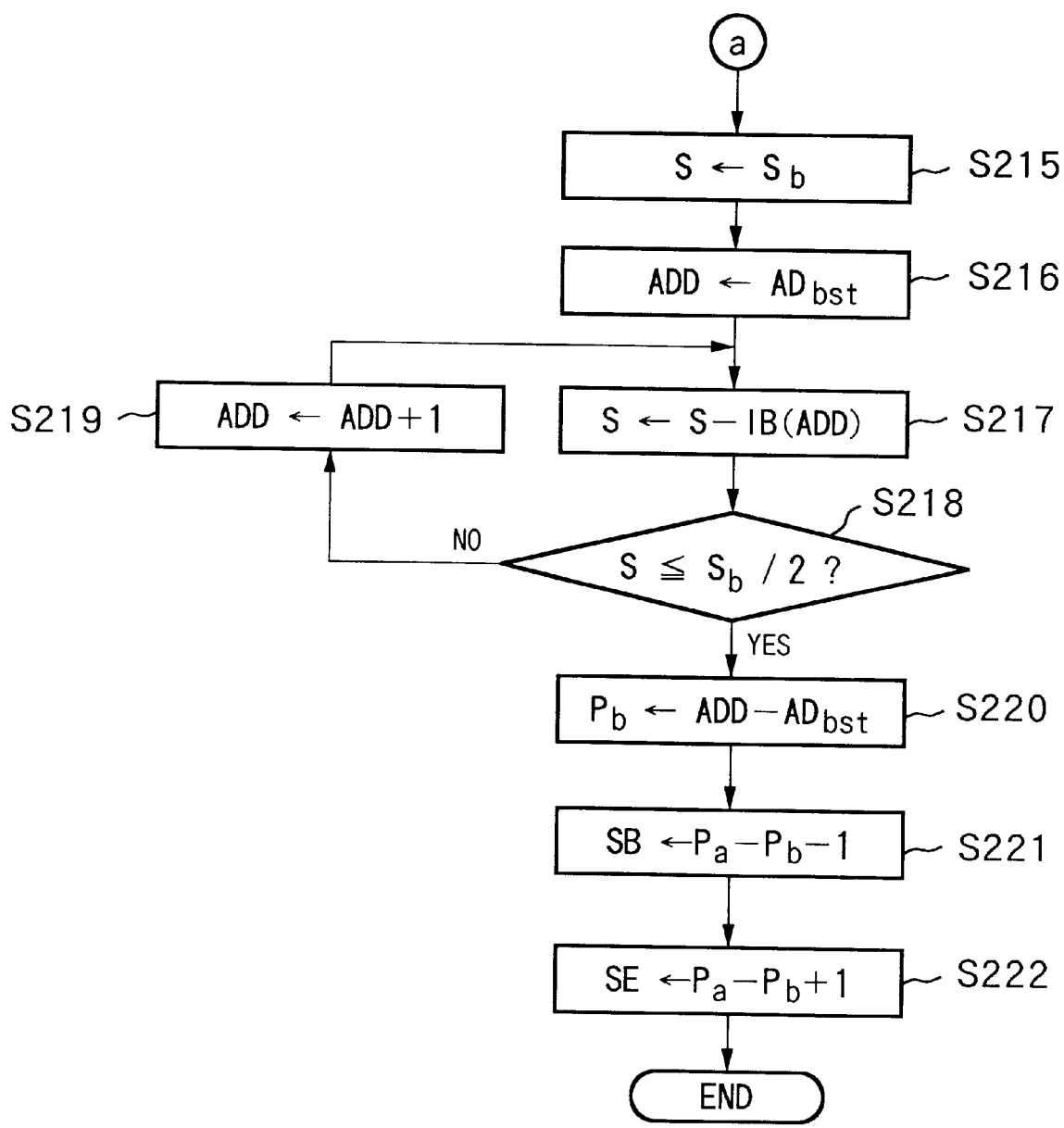
FIG. 8 is a flowchart showing the operation performed in step S106 in FIG. 6.

Flowcharts shown in FIGS. 7 and 8 show details of the process of step S106. First, referring to FIG. 7, a position corresponding to the rough center of the total of the pixel data values of the signal pattern A is obtained in processes of steps S201 to S210, and a position corresponding to the rough center of the total of the pixel data values of the signal pattern B is obtained in processes of steps S211 to S220. In subsequent steps S221 and S222, a rough phase difference of the two signal patterns A and B are obtained. The foregoing processes are described in more detail below.

First in step S201, a total Sa representing the total of pixel data values of the signal pattern A is initialized (set to 0), and a top address, ADast, of the storage medium (not shown) which stores the pixel data values of the signal pattern A is set to an address ADD.

In the subsequent steps S202, S203 and S204, the pixel data values, stored in the storage medium (not shown) at the address ADast to a last address ADaend, of the signal pattern A are sequentially added to obtain the total of the pixel data values of the signal pattern A. Note, IA(ADD) in step S202 denotes pixel data value, stored at the address ADD, of the signal pattern A.

In the next steps S205 and S206, initialization for obtaining a position corresponding to a rough center of the total of the pixel data values of the signal pattern A in the subsequent steps S207 to S209, is performed. More specifically, a variable S is set to the total Sa of the pixel data values of the signal pattern A in step S205, and the address ADD is set to the top address ADast of the storage medium to which the pixel data values of the signal pattern A are stored, in step S206.

While looping steps S207 to S209, the pixel data values are sequentially subtracted from S, which holds the total of the pixel data values of the signal pattern A, and the difference is stored as S. The processes of steps S207 to S209 are repeated until S becomes equal to or less than Sa/2.

The rough center of the total of the pixel data values of the signal pattern A is at the address of the storage medium when the process leaves the loop of steps S207 to S209, namely, the address ADD. Therefore, in step S210, the top address ADast is subtracted from the address ADD to obtain a pixel position Pa corresponding to the rough center.

In subsequent steps S211 to S220, a pixel position Pb corresponding to a rough center of the total of the pixel data values of the signal pattern B is obtained in the same manner as that of steps S201 to S210. Note, in steps S211 to S220, Sb denotes the total of the pixel data values of the signal pattern B; ADbst, a top address of the signal pattern B; ADbend, an end address of the signal pattern B; IB(ADD), a pixel data value of the signal pattern B stored at the address ADD.

In steps S221 and S222, the start shift amount SB and the end shift amount SE of the shift range subjected to correlation operation are obtained.

Since a difference between Pa and Pb (Pa−Pb) is the rough phase difference between the two signal patterns A and B, and the start shift amount SB of the shift range is determined by subtracting 1 from the difference between Pa and Pb, and the end shift amount SE is determined by adding 1 to the difference between Pa and Pb. Note that in the second embodiment, the start shift amount SB and the end shift amount SE of the shift range are (Pa−Pb)±1, however, the present invention is not limited to this, and in a case where the precision of Pa and Pb is not high, for instance, it is possible to widen the shift range by determining the start shift amount SB and the end shift amount SE by, e.g., (Pa−Pb)±3.

An example of the aforesaid operation of determining rough centers of the signal patterns A and B is explained with reference to FIGS. 29A and 29B.

Figure 29A:
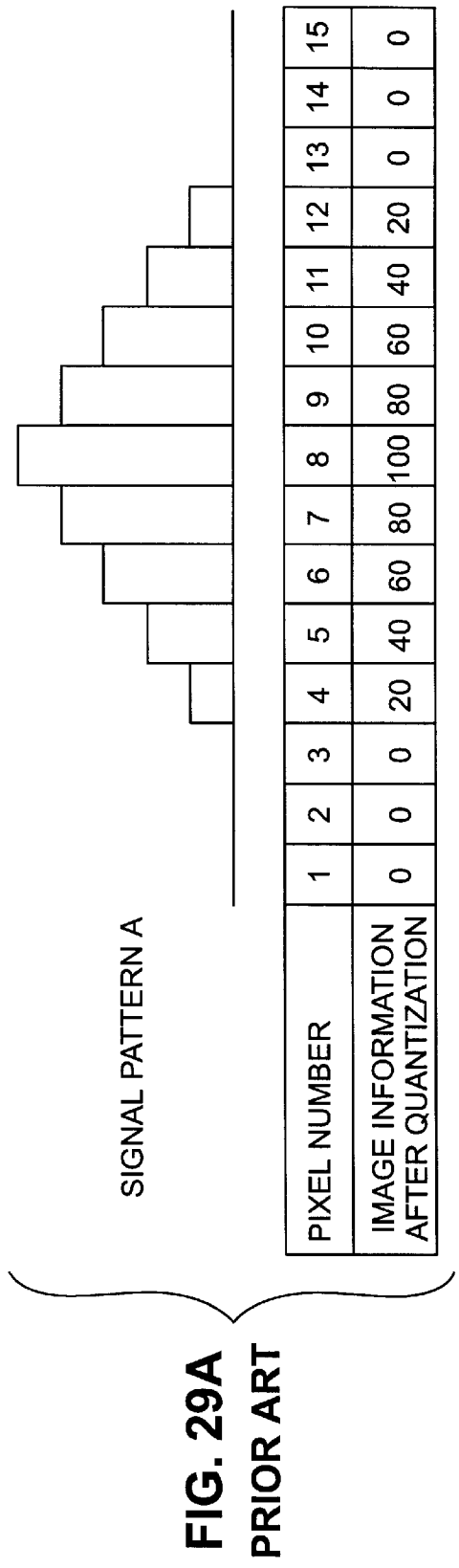
FIGS. 29A and 29B show an example of a pair of image information.
Figure 29B:
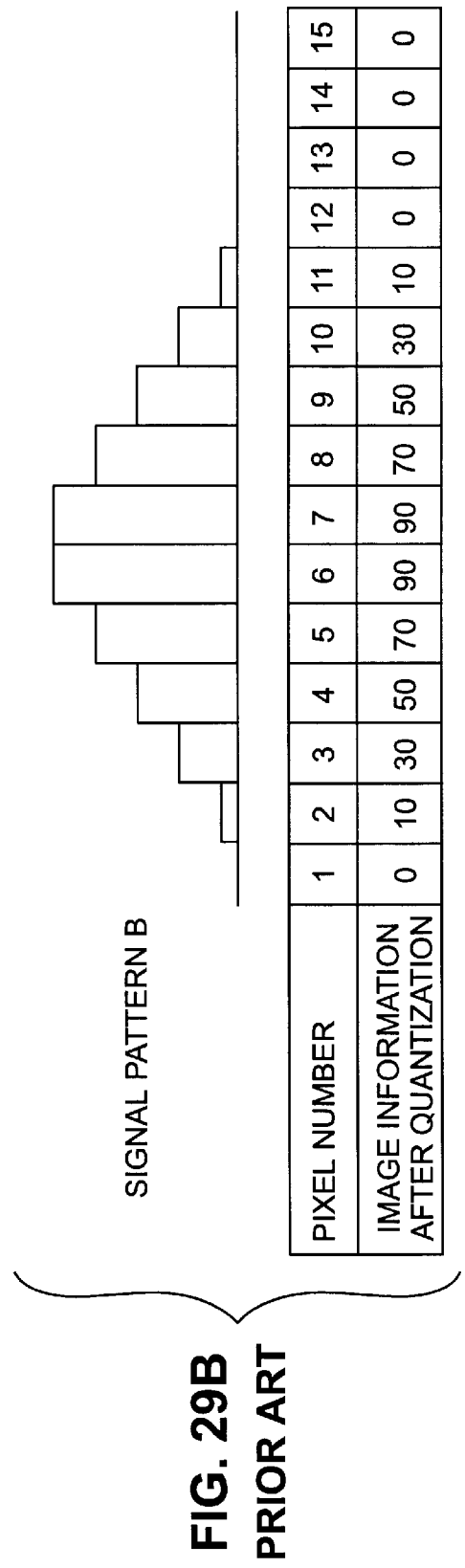

In the histograms of FIGS. 29A and 29B, image information obtained by applying A/D conversion to output from the CCD 56 having two sensor arrays of 15 pixels is shown in the ordinate, and pixels of each sensor array are shown in the abscissa. FIG. 29A shows the signal pattern A and the FIG. 29B shows the signal pattern B. Further, the table under each histogram shows pixel data values of the output from the CCD 56 after A/D conversion in correspondence with the respective pixels of the sensor arrays, First, the totals of the pixel data values are calculated. The total Sa of the pixel data values of the signal pattern A is, $$Sa = 0 + 0 + 0 + 20 + 40 + 60 + 80 + 100 + 80 + 60 +$$
$$40 + 20 + 0 + 0 + 0$$
$$= 500$$

Similarly, the total Sb of the pixel data value of the signal pattern B is calculated and is also 500.

Thereafter, the pixel data values of the signal patterns A and B are sequentially subtracted from the totals Sa and Sb, respectively, in the ascending (or descending) order from the values corresponding to the first (or fifteenth) pixels. Each time a pixel data value is subtracted from the total, the difference is compared with Sa/2, in the case of the signal pattern A, or with Sb/2, in the case of the signal pattern B, and the pixels when the differences become equal to or less than Sa/2 and Sb/2 are detected. The detected pixels are the positions corresponding to the rough centers of the totals of the pixel data values. The position Pa corresponding to the rough center of the total of the pixel data values of the signal pattern A in FIG. 29A is the eighth pixel, and the position Pb corresponding to the rough center of the total of the pixel data values of the signal pattern B in FIG. 29B is the sixth pixel. Accordingly, the rough phase difference between the two signal patterns A and B is, $$Pa-Pb=8-6=2[bits]$$

According to the flowchart shown in FIGS. 7 and 8, the start shift amount SB of the shift range is 1 bit, and the end shift amount is 3 bit.

Figure 30:
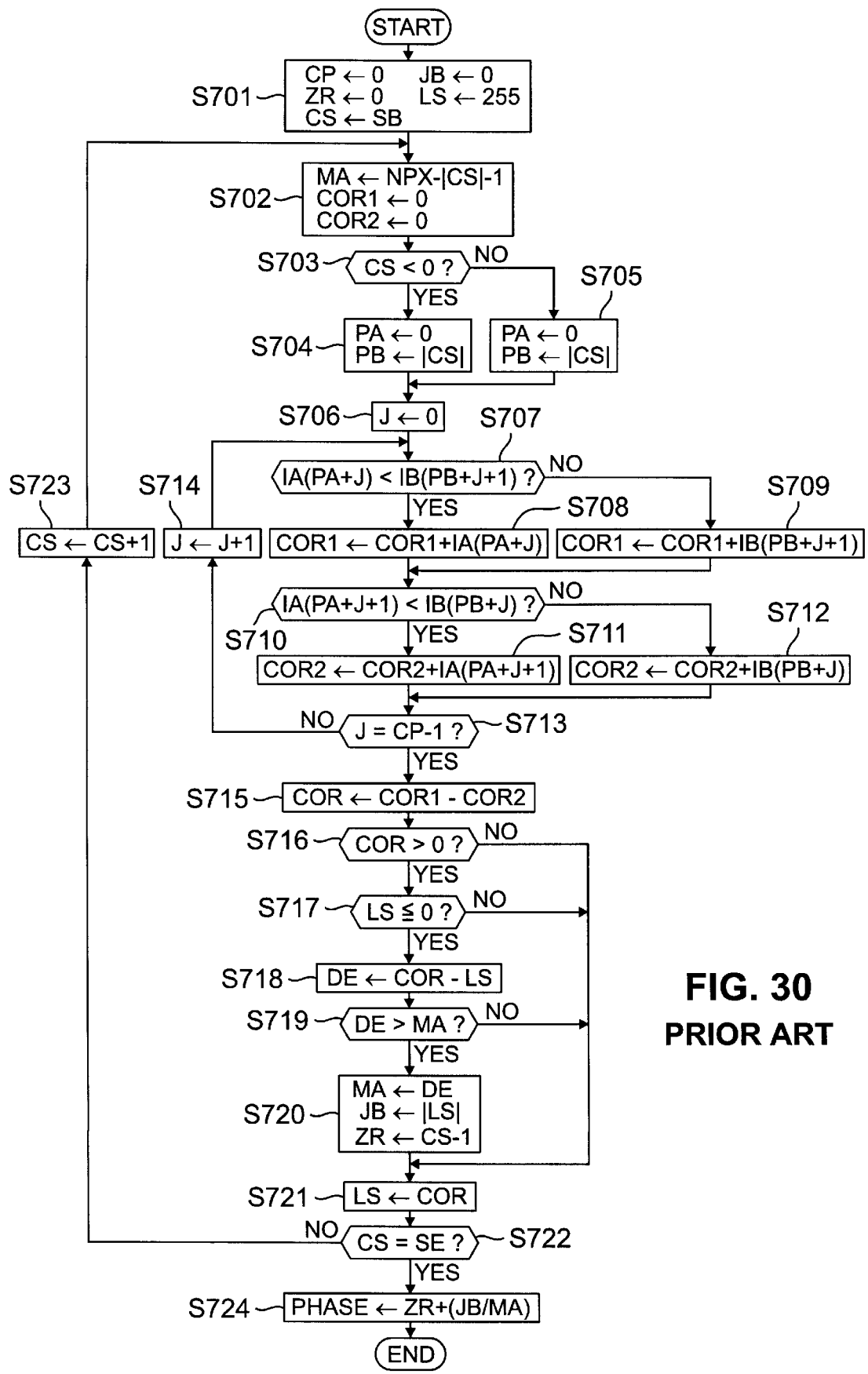
FIG. 30 is a flowchart for explaining correlation operation.
Figure 31:
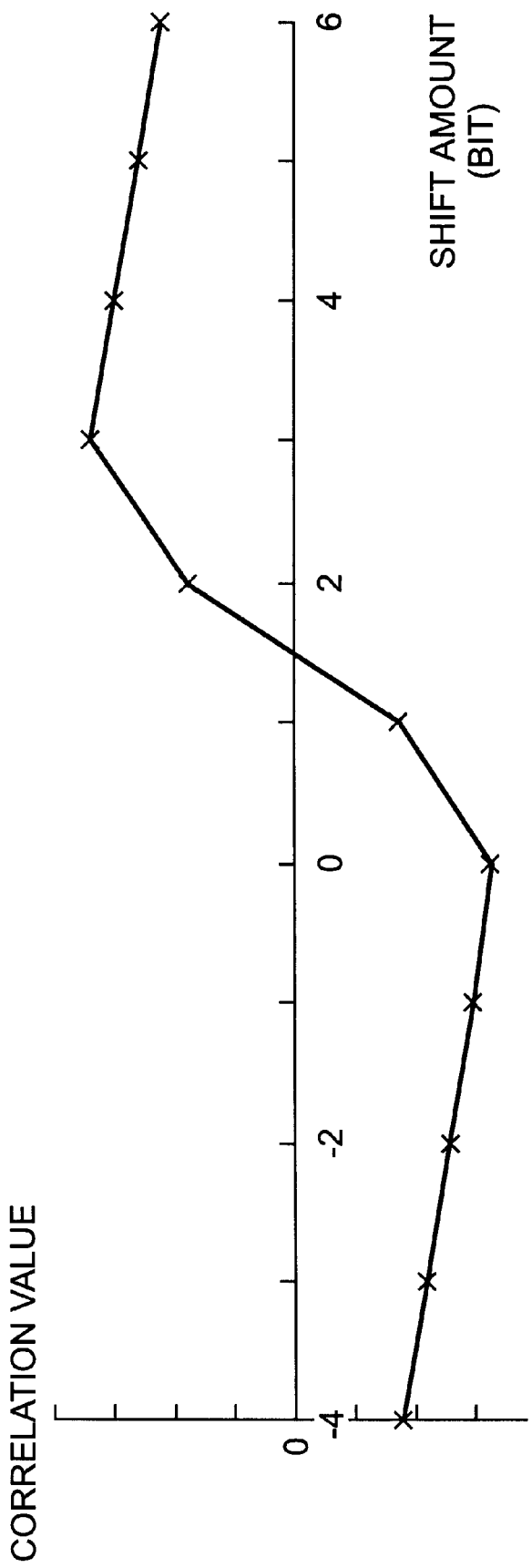
FIG. 31 is a graph for explaining the operation in FIG. 30.

Referring to FIG. 6, in step S107, correlation operation is performed within the shift range determined by the start shift amount SB and the end shift amount SE, obtained in step S106. Then, the zero cross point where the calculated correlation value intersects the y=0 coordinate line when the y axis represents correlation value, namely, where the correlation value changes from the negative value to the positive value, is detected. FIG. 30 is a flowchart explaining the details of step S107. Since the processes of the flowchart in FIG. 30 have already been described above, the explanation of them is omitted.

Figure 9:
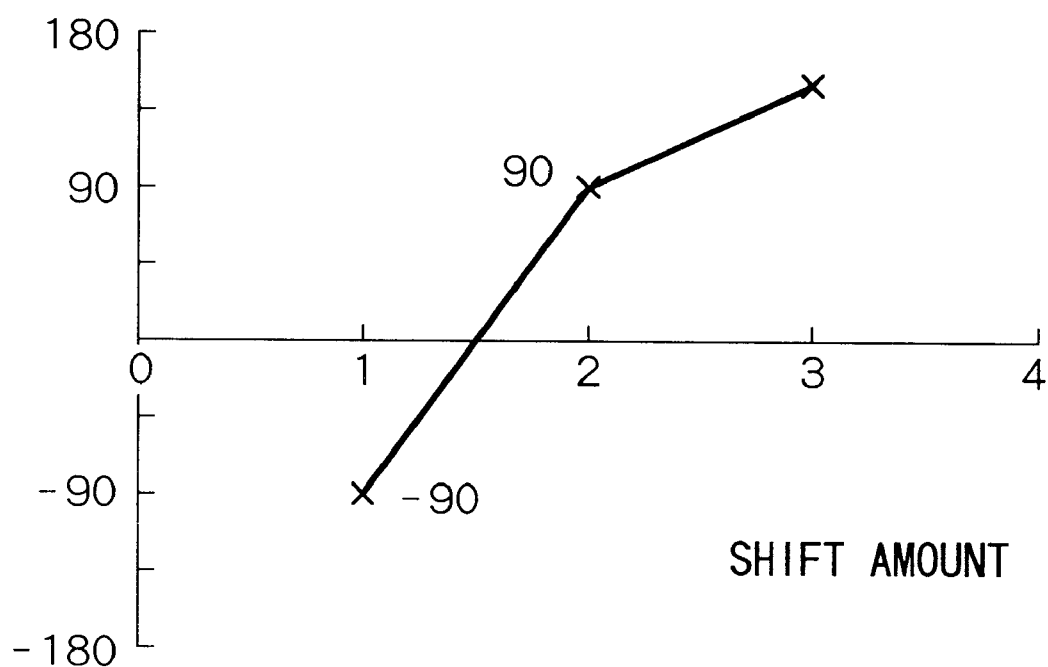
FIG. 9 is a graph for explaining the operation shown in FIGS. 7 and 8.

FIG. 9 is a graph showing correlation values when the signal pattern B is shifted from the start shift amount SB (1 bit) to the end shift amount SE (3 bits) when the signal patterns A and B are as shown in FIGS. 29A and 29B. The shift amount where the signal patterns A and B coincide is at zero cross point where the correlation value changes from a negative value to a positive value as described above; thus, it is known from FIG. 9 that the zero cross point exists between the shift amounts of 1 bit and 2 bits.

In step S108, the zero cross point is obtained by linear interpolation based on the correlation values obtained in step S107, thereby a high precision phase difference is obtained. The phase difference between the pair of image information as shown in FIGS. 29A and 29B is, $$1+|-90|/(|-90|+90)=1.5 \text{ [bits]}$$

Finally, the phase difference is converted to a value representing a distance in step S109. The conversion may be performed based on a distance and a phase difference, observed when an object is at the distance, stored in advance in EEPROM (not shown) at the time of manufacturing the distance measuring apparatus.

According to the second embodiment as described above, pixel positions corresponding to the rough centers of the totals of pixel data values of a pair of image information are obtained by the characteristic extraction unit 59, and a start shift amount and an end shift amount of the shift range subjected to correlation operation between the pair of the image information are obtained on the basis of a difference between the obtained pixel positions, as explained above with reference to FIGS. 7 and 8. Accordingly, time taken to perform correlation operation is shortened.

Note, in the above explanation of the operation of the characteristic extraction unit 59 on the basis of the pair of image information in the second embodiment (step S106 in FIG. 6), the positions corresponding to the rough centers of the totals of pixel data values of a pair of image information are obtained, however, the present invention is not limited to this. For instance, peak values of the pair of image information may be detected instead of the rough centers, and a difference between the peak values may be calculated as the rough phase difference. In this manner, it is also possible to shorten time taken to perform correlation operation, similarly to the method as described with reference to FIGS. 7 and 8.

Further, in the second embodiment, the above operation is performed in the active mode, however, it is possible to apply the operation explained in the second embodiment to operation performed in the passive mode in which light-emitting device is not used and a distance is measured in dependence upon contrast of an object.

First Modification of the Second Embodiment

In the second embodiment as described above, positions corresponding to rough centers of totals of pixel data values of a pair of image information are searched, and a start shift amount and an end shift amount of a shift range subjected to correlation operation between the pair of image information are determined on the basis of a difference (phase difference) between the positions of rough centers; thereby shortening time taken in the correlation operation.

In a case of performing distance measuring operation in the active mode by projecting a beam spot onto an object to be measured, if the object is beyond a distance to which the distance measuring operation in the active mode is effective, or if reflectance of the object is very low, the signal levels of image information representing the object become low, too. In such cases, the image information often affected by noises, which may disable the distance measuring apparatus to obtain a correct center of the total of the pixel data values.

Figure 10A:
FIGS. 10A and 10B show an example of image information with which the distance measuring operation as described in the second embodiment may fail.
Figure 10B:
Figure 11:
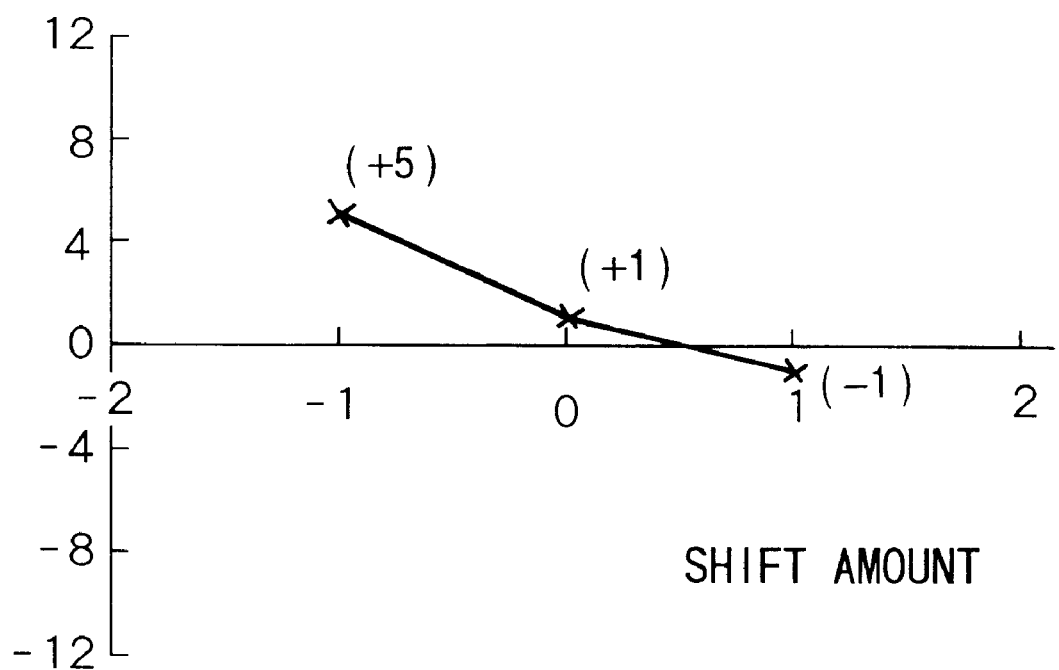
FIG. 11 a graph for explaining a case where the distance measuring operation according to the second embodiment is performed on the image information shown in FIGS. 10A and 10B.

An example of image information in the above cases is shown in FIGS. 10A and 10B. Referring to the histograms shown in FIGS. 10A and 10B, the bins which are filled with oblique lines are image information representing an object, and the other bins are external noises. In this case, when positions corresponding to the rough centers of totals of pixel data values of respective image information are calculated in the method as described in the second embodiment, the sixth pixels are determined as the center position both in signal patterns A and B. Under this condition, correlation values obtained in the method described in the second embodiment are as shown FIG. 11, and as it is known from FIG. 11, there is no zero cross point where the correlation value changes from a negative value to a positive value. As it is easily seen in FIGS. 10A and 10B, the zero cross point should appear at a shift amount of 2 bits; however, correlation operation with a shift amount of 2 bits is omitted since the start shift amount is −1 bit and the end shift amount is 1 bit ((6−6)±1). In this case, it may be improperly determined that the two signal patterns do not coincide with each other.

Accordingly, in the first modification of the second embodiment, peak values of a pair of image information after A/D conversion are detected, and if the peak values are smaller than a predetermined value, then the omission of correlation operation as described in the second embodiment is inhibited, and a phase difference between the pair of image information is determined in the conventional method.

Figure 12:
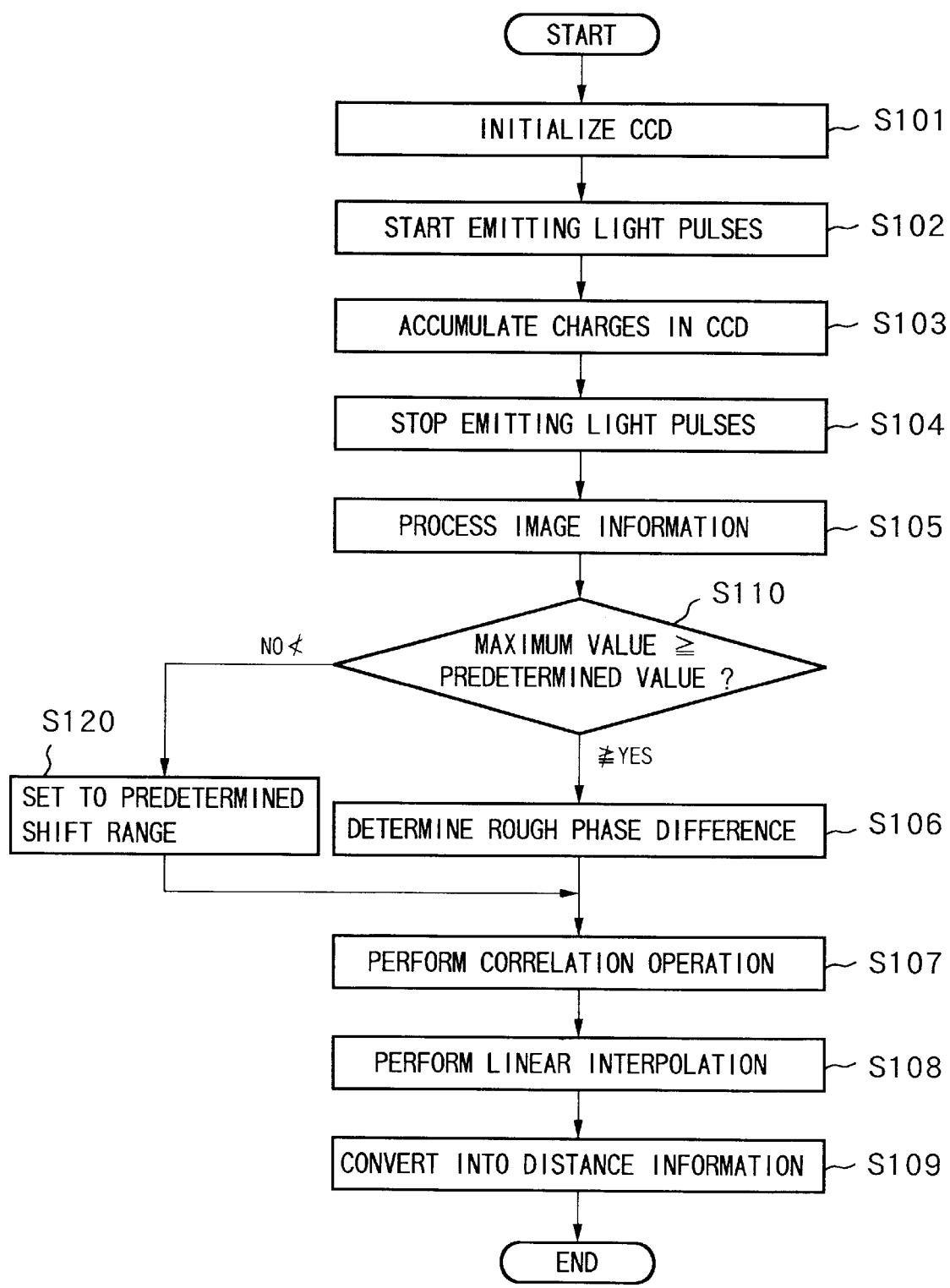
FIG. 12 is a flowchart showing an operation of the distance measuring apparatus according to a first modification of the second embodiment of the present invention.

FIG. 12 is a flowchart showing an operation of a distance measuring apparatus according to the first modification of the second embodiment. Note, the configuration of the distance measuring apparatus according to the first modification of the second embodiment is the same as that described with reference to FIG. 5 in the second embodiment. Further, the same step numbers as those in FIG. 6 are used in FIG. 12 for denoting the same processes.

First, initialization is performed for a predetermined period in order to clear all the residual charges within the CCD 56 in step S101. After the initialization, the light-emitting element driver 58 drives the IRED 54 to start emitting light pulses in step S102, and accumulation of charges in the CCD 56 is performed for a predetermined period or until an output value from the CCD 56 reaches a predetermined level in step S103. After charges are accumulated until either one of the above conditions is satisfied, the accumulation of charges in the CCD 56 is finished-as well as the IRED 54 is controlled to stop emitting light pulses in step S104. The pair of image information stored in the CCD 56 are amplified and applied with A/D conversion in the processing circuit 57, and stored in storage medium (not shown) in the control unit 55 in step Sl05. One of the pair of the image information is referred to as "signal pattern A", and the other image information is referred to as "signal pattern B" hereinafter.

In next step S110, the maximum (peak) values among pixel data values of the respective image information of the signal patterns A and B are detected and these maximum values are compared to a predetermined value. If both of the maximum values are equal to or grater than the predetermined value, it is determined that the pixel data values of the image information, are large enough to avoid the effect of noises when performing correlation operation. Accordingly, pixel positions Pa and Pb corresponding to the rough centers of the totals of the pixel data values of the signal patterns A and B are determined and a rough phase difference of the signal patterns A and B is obtained in step S106 in the method described in the second embodiment. Thereafter, similarly to the second embodiment, correlation operation is performed in step S107, linear interpolation is performed in step S108, then conversion to distance information is performed in step S109.

Whereas, if at least one of the maximum values of the two image information is less than the predetermined value, as in a case shown in FIGS. 10A and 10B, it is determined that the pixel data values of the image information are too small to avoid the effect of noises when performing correlation operation. In this case, since there is a possibility that a wrong distance is obtained when a phase difference is determined in the method as described in the second embodiment, the process proceeds to step S120, where the start shift amount SB and the end shift amount SE of the shift range subjected to correlation operation are respectively set to predetermined values as in the conventional method. Thereafter, correlation operation is performed in step S107, linear interpolation is performed in step S108, then conversion to distance information is performed in step S109.

As an example of performing the process of step S120, the signal pattern B as shown in FIG. 10B is shifted from −4 bits to 6 bits by a bit, then zero cross point or points where the correlation value changes from a negative value to a positive value are detected. Then, linear interpolation is performed on the basis of the correlation values obtained before and after the zero cross point or points, and the phase difference of the pair of signal patterns is determined. In this case, the phase difference of the pair of signal patterns is −2 bits. Note, the reason why −2 bits is determined as the phase difference of the pair of the signal patterns between the two zero cross points as shown in FIG. 13 is that reliability of coincidence of the two signal patterns is higher at a zero cross point where a rate of change is larger, as described in the background of the invention.

According to the first modification of the second embodiment as described above, maximum values of a pair of image information are obtained, and if the maximum values are too small to avoid the effect of noises, determination of a rough phase difference using the characteristic extraction unit 59 is inhibited, thereby it is possible to avoid wrong determination of distance.

Note, in the first modification of the second embodiment, whether the characteristic extraction unit 59 is to be used or not is determined on the basis of maximum values of the image information (step S110 in FIG. 12); however, the determination method is not limited to this. For example, by obtaining contrast values of a pair of image information by performing known contrast operation, and then comparing the contrast values to a predetermined value, it is possible to determine whether or not to perform the determination of a rough phase difference by the characteristic extraction unit 59. This method is especially effective to distance measuring operation in the passive mode which depends upon contrast of the object.

Second Modification of the Second Embodiment

In the first modification as described above, maximum values of a pair of A/D converted image information are detected, and determination of a rough phase difference using the characteristic extraction unit 59 in the method described in the second embodiment is inhibited when at least one of the maximum values is smaller than a predetermined value, then a phase difference between a pair of image information is determined using a conventional method.

Figure 14A:
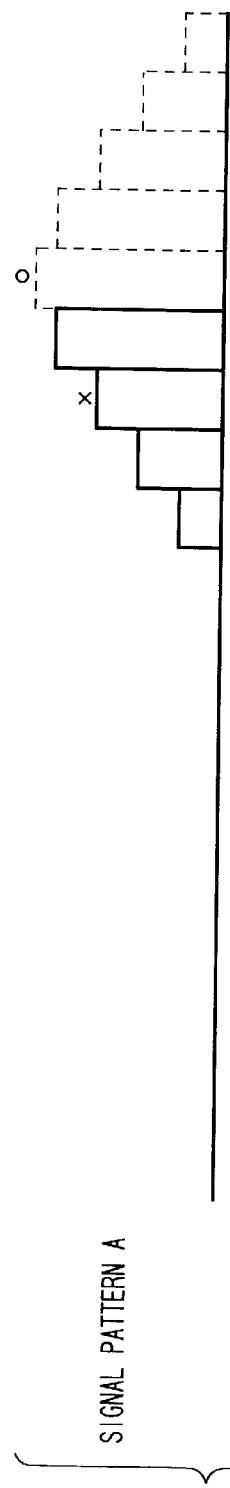
FIGS. 14A and 14B show another example of image information with which the distance measuring operation as described in the second embodiment may fail.
Figure 14B:
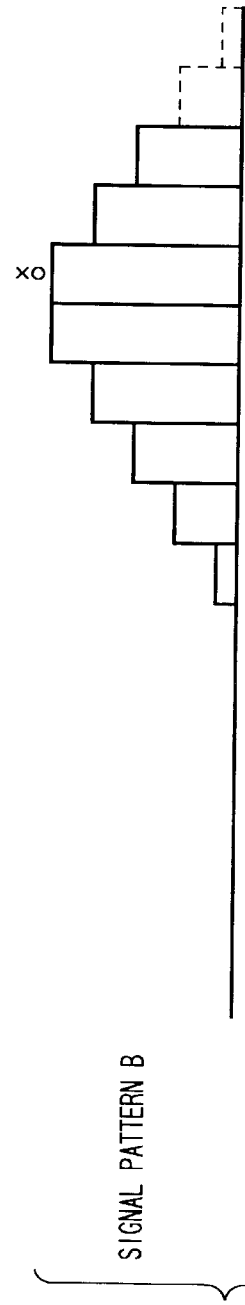

In addition to the case described in the first modification, there is a case which may cause a wrong distance determination if the distance measuring operation is performed in the method described in the second embodiment, and an example is shown in FIGS. 14A and 14B. FIGS. 14A and 14B show a case where an object to be measured is at a very short distance, and images of the object are formed outside of the sensor arrays of the CCD 56. Bins expressed with broken lines in FIGS. 14A and 14B represent image information which is supposedly obtained if the images of the object are formed within the sensor arrays, thus, image information corresponding to these bins is not applied with A/D conversion in practice in practice.

When the image information is as described above, if a rough phase difference between the pair of image information is determined using the characteristics extraction unit 59, positions of bins marked by small circles are true centers of the totals of the pixel values, or peak positions, and the rough phase difference is 3 bits. However, the image information actually applied with A/D conversion is represented by bins of solid lines; therefore, the rough centers of the totals of the pixel data values of the image information according to the second embodiment are positions of bins marked by crosses in FIGS. 14A and 14B. In this case, the rough phase difference is 1 bit. If the start shift amount and the end shift amount of the shift range subjected to correlation operation are determined on the basis of the calculated rough phase difference, namely, 1 bit, a wrong distance is obtained as a result.

Accordingly, in the second modification of the second embodiment, if at least one of the maximum values of a pair of image information is outside of a predetermined range of the sensor arrays of the CCD 56, it is determined that a part of the image of the object is formed outside of the sensor array of the CCD 56. Accordingly, operation of obtaining a rough phase difference between two image information using the characteristic extraction unit 59 is inhibited.

Figure 15:
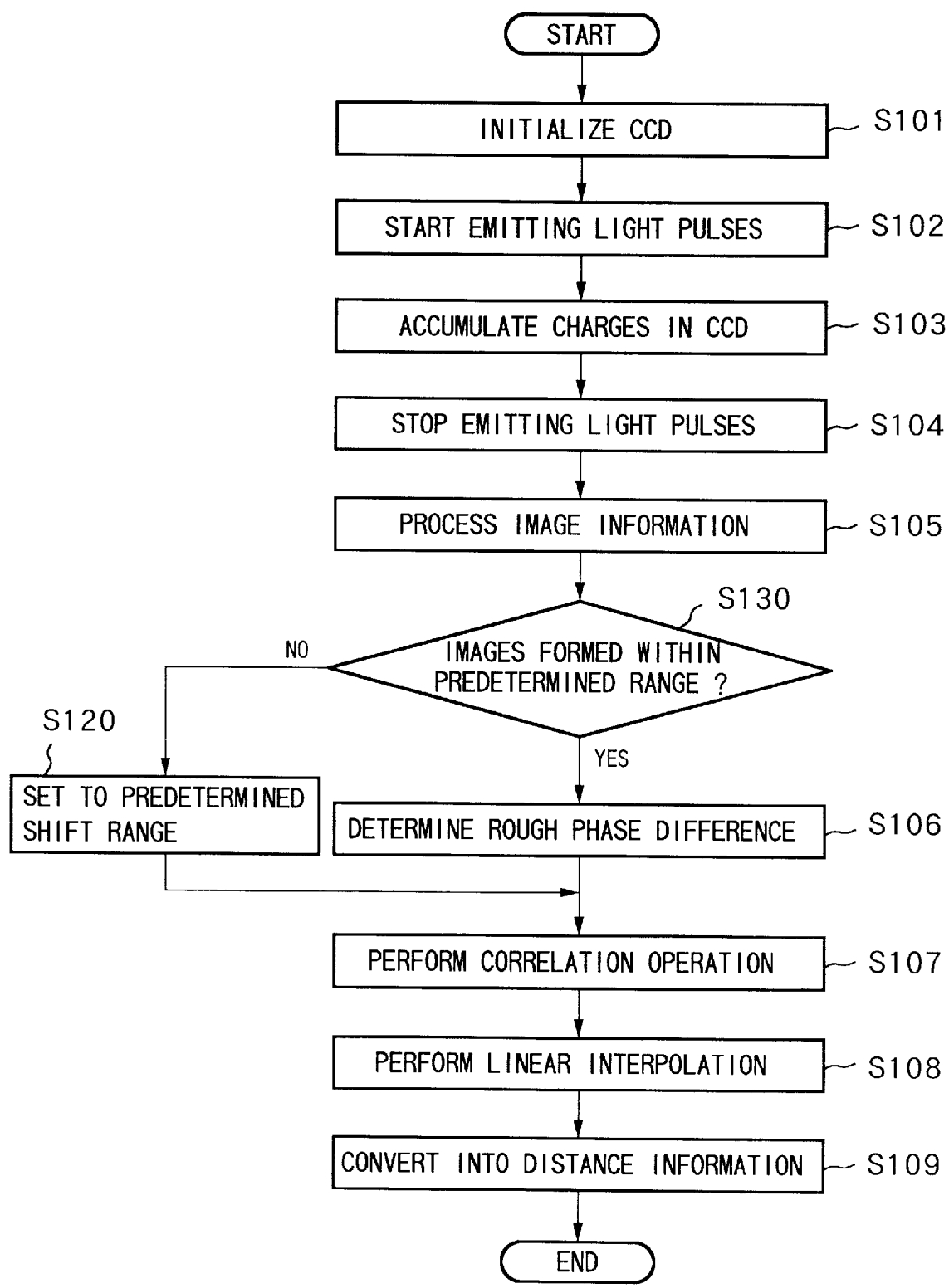
FIG. 15 is a flowchart showing an operation of the distance measuring apparatus according to a second modification of the second embodiment of the present invention.

FIG. 15 is a flowchart showing an operation of a distance measuring apparatus according to the second modification of the second embodiment. Note, the configuration of the distance measuring apparatus according to the second modification of the second embodiment is the same as that described with reference to FIG. 5 in the second embodiment, and the same step numbers as those in FIGS. 6 and 12 are used in FIG. 15 for denoting the same processes.

First, initialization is performed for a predetermined period in order to clear all the residual charges within the CCD 56 in step S101. After the initialization, the light-emitting element driver 58 drives the IRED 54 to start emitting light pulses in step S102, and accumulation of charges in the CCD 56 is performed for a predetermined period or until an output value from the CCD 56 reaches a predetermined level in step S103. After charges are accumulated until either one of the above conditions is satisfied, the accumulation of charges in the CCD 56 is finished as well as the IRED 54 is controlled to stop emitting light pulses in step S104. The pair of image information stored in the CCD 56 are amplified and applied with A/D conversion in the processing circuit 57, and stored in storage medium (not shown) in the control unit 55 in step S105. One of the pair of the image information is referred to as "signal pattern A", and the other image information is referred to as "signal pattern B" hereinafter.

In next step S130, pixel positions corresponding to the maximum (peak) values of pixel data values of the respective image information of the signal patterns A and B are determined, and whether or not the determined pixel positions are within a predetermined pixel range of the sensor arrays is judged. If both of the pixel positions corresponding to the maximum values are within the predetermined range, it is considered that the images of the object are both formed within the sensor arrays of the CCD 56. Accordingly, positions Pa and Pb corresponding to the rough centers of the totals of the pixel data values of the signal patterns A and B are determined and a rough phase difference between the signal patterns A and B is obtained in step S106 in the method described in the second embodiment. Thereafter, correlation operation is performed in step S107, linear interpolation is performed in step S108, then conversion to distance information is performed in step S109, similarly to the second embodiment.

Whereas, if at least one of the pixel positions corresponding to the maximum values of the two image information is outside of the predetermined pixel range, as in a case shown in FIGS. 14A and 14B, it is considered that a part of the image of the object is formed outside of the sensor arrays of the CCD 56. In this case, since there is a possibility that a wrong distance is obtained when a shift range is determined in the same manner as described in the second embodiment, the process proceeds to step S120 where the start shift amount SB and the end shift amount SE of the shift range subjected to correlation operation are respectively set to predetermined values as described in the conventional method, thereafter, correlation operation is performed in step S107, linear interpolation is performed in step S108, then conversion to distance information is performed in step S109.

According to the second modification of the second embodiment as described above, whether or not images of an object are formed within sensor arrays of the CCD 56 is determined on the basis of pixel positions corresponding to the maximum values of a pair of image information, and, when at least a part of the image of the object is formed outside of the sensor arrays of the CCD 56, detection of a rough phase difference using the characteristic extraction unit 59 is inhibited, thereby avoiding wrong determination of distance.

Third Embodiment

Next, the third embodiment of the present invention will be explained.

Figure 16:
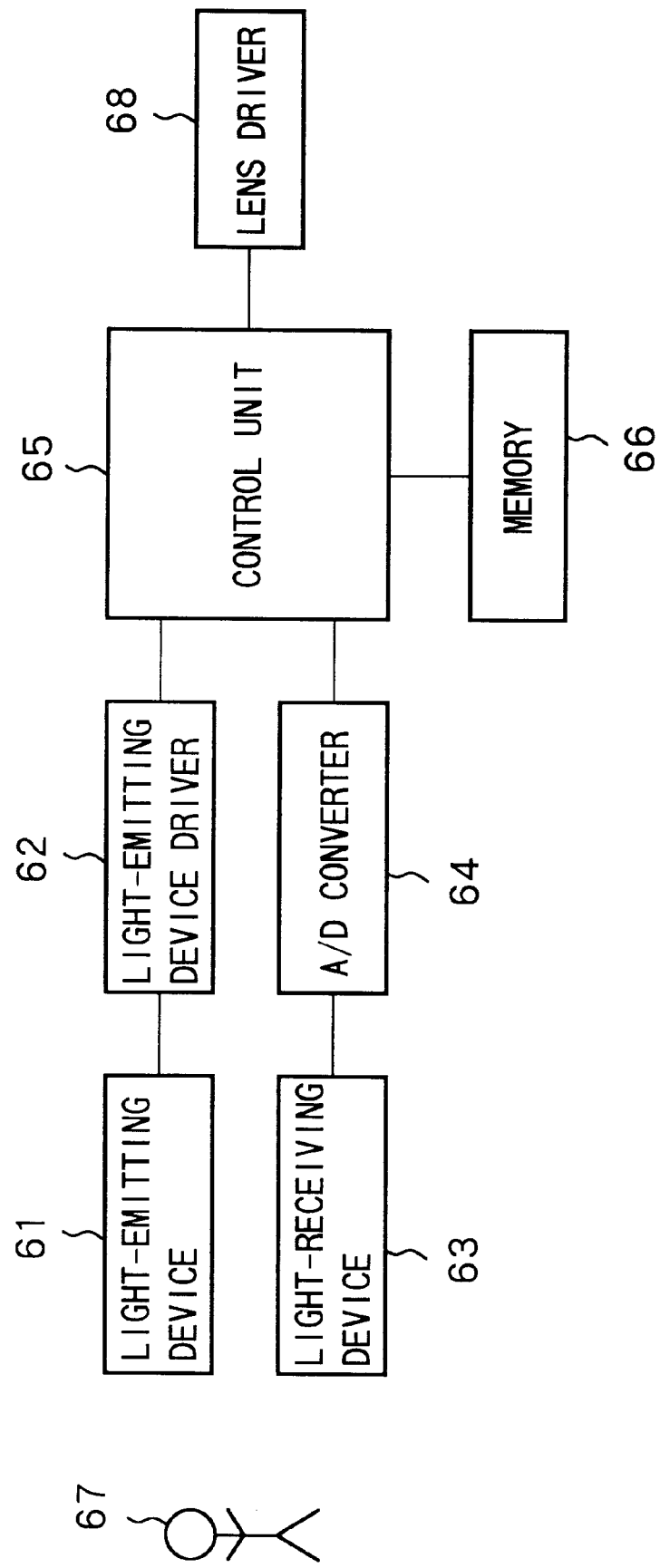
FIG. 16 is a diagram briefly showing a configuration of a distance measuring apparatus according to a third embodiment of the present invention.

FIG. 16 is a block diagram illustrating a brief configuration of a distance measuring apparatus according to the third embodiment. In FIG. 16, reference numeral 61 denotes a light-emitting device for projecting a beam spot onto an object to be measured in the active mode. The light-emitting device 61 includes a projection lens and a light-emitting element, such as an infrared light-emitting element (IRED). Reference numeral 62 denotes a light-emitting device driver for driving the light-emitting element of the light-emitting device 61. The light-emitting device driver 62 is controlled by a control unit 65 which will be explained later.

Reference numeral 63 denotes a light-receiving device configured with a pair of light-receiving lenses and a pair of photoelectric conversion elements, such as CCDs, capable of performing skimming operation. The light-receiving device 63 corresponds to the first sensor array 2805 and the second sensor array 2806 shown in FIG. 28, for instance. Reference numeral 64 denotes an A/D converter, which applies A/D conversion to the photoelectric converted signals by the light-receiving device 63. The A/D converted signals correspond to a pair of image information used for correlation operation. Reference numeral 65 denotes the control unit for controlling overall distance measuring operation, such as control of the light-emitting device driver 62 and calculations using the pair of image information.

Reference 66 denotes memory, including EEPROM for storing a shift range subjected to correlation operation in the active mode and in the passive mode, and RAM for temporarily storing the pair of image information from the A/D converter 64. Reference numeral 67 denotes an object to be measured.

Reference numeral 68 denotes a lens driver for moving a focus lens on the basis of a result of distance measuring operation.

Figure 17:
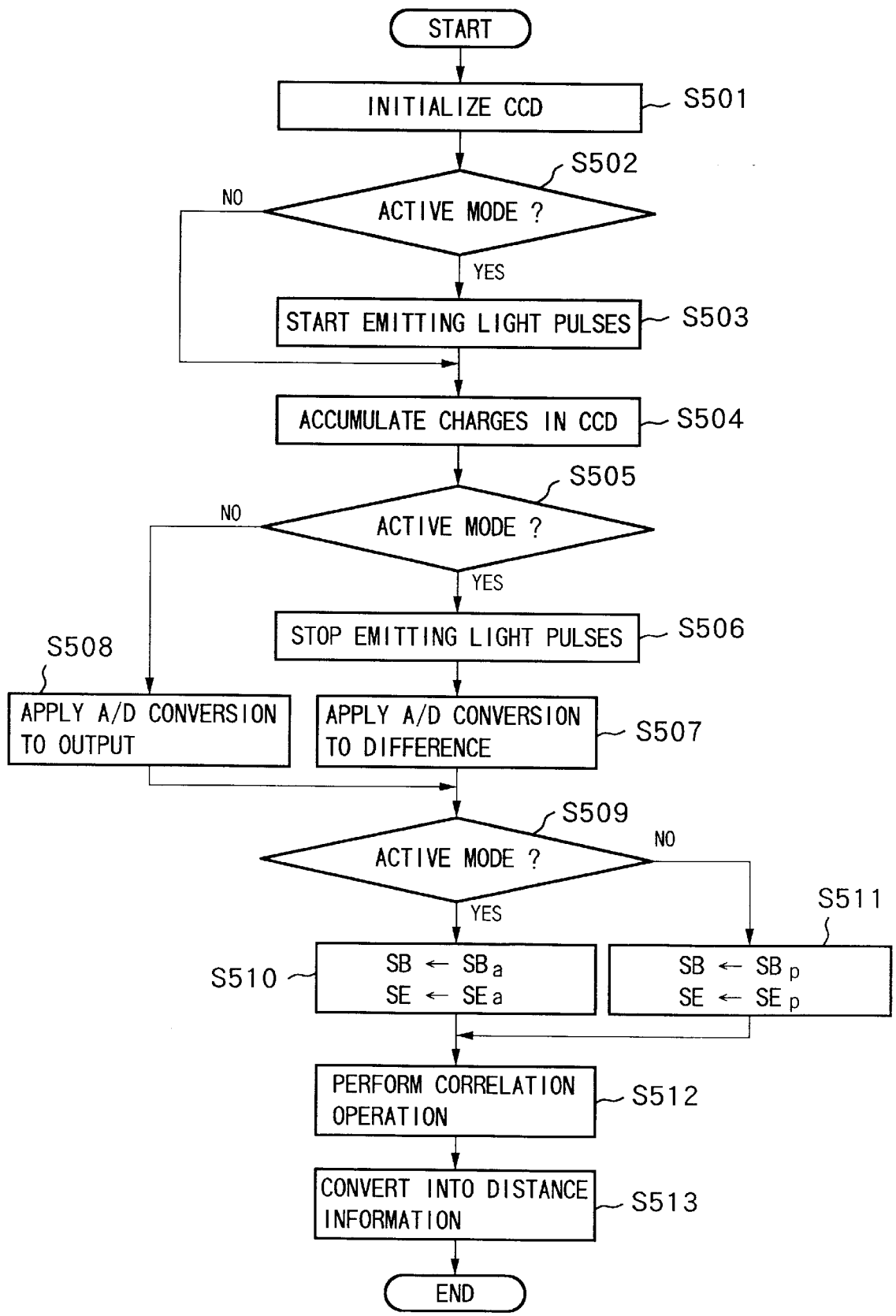
FIG. 17 is a flowchart showing an operation of the distance measuring apparatus according to the third embodiment of the present invention.
Figure 32:
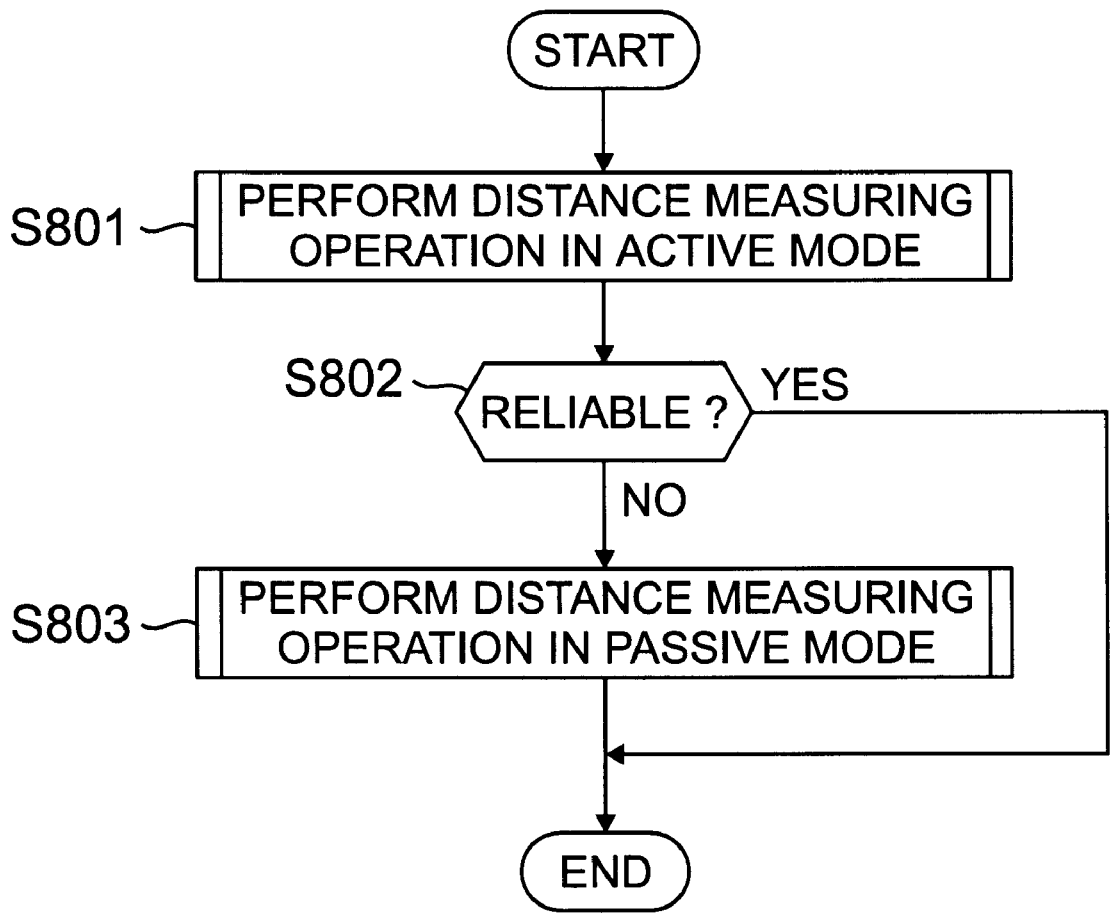
FIG. 32 is a flowchart showing switching between the active mode and the passive mode in the distance measuring apparatus as shown in FIG. 28.

FIG. 17 is a flowchart showing an operation of the distance measuring apparatus as shown in FIG. 16. Similarly to the operation shown in FIG. 32, the basic operation of the distance measuring apparatus according to the third embodiment is to perform distance measuring operation in the active mode, then depending upon the reliability of the obtained result, whether to perform distance measuring operation in the passive mode or to adopt the result of the distance measuring operation in the active mode is determined. In the set mode (either the active mode or the passive mode), the correlation operation, as shown in FIG. 30, is performed in step S512 of FIG. 17.

First, CCD is initialized in order to clear all the residual charges within the CCDs in step S501 before starting accumulating charges. After the initialization, the light-emitting device driver 62 drives the light-emitting device 61 to start emitting light pulses in step S503 if the active mode has been set, and charges are accumulated in the CCDs in step S504. When performing distance measuring operation in the passive mode, after the initialization of the CCD is finished in step S501, charges are accumulated in the CCD without performing the skimming operation in step S504.

In step S504, charges are accumulated for a predetermined period or until an output value from the CCDs becomes a predetermined level. After the accumulation of charges is completed, the light-emitting device 61 is controlled to stop emitting light pulses in step S506 if the active mode has been set, and the difference between the outputs from the light-receiving device 63 accumulated while the light-emitting device 61 is on and while the light emitting device is off is A/D converted by the A/D converter 64.

Whereas, if the passive mode has been set, outputs either from the ON-pixels or OFF-pixels are A/D converted by the A/D converter 64. The A/D converted image information is temporarily stored in the memory 66.

Next, processes for determining a shift range subjected to correlation operation (i.e., setting of a start shift amount and an end shift amount of the shift range subjected to correlation operation) are performed. In the active mode, the start shift amount SB is set to SBa, and the end shift amount SE is set to SEa in step S210.

Whereas, in the passive mode, SB is set to SBp and SE is set to SEp in step S511. After setting the start and end shift amounts of the shift range subjected to the correlation operation, change in correlation value is obtained in the method as shown in FIG. 30, and a phase difference between the pair of image information is determined in step S512.

Finally, the phase difference is converted to a value corresponding to a distance in step S513. The conversion may be performed based on a distance and a phase difference, observed when an object is at the distance, stored in advance in the memory 66 at the time of manufacturing the distance measuring apparatus.

According to the third embodiment as described above, by determining the start shift amount and the end shift amount of the shift range for the active mode and the passive mode, independently, in steps S510 and S511 of FIG. 17, distance measuring operation (i.e., the distance) is performed within the shift range suitable for each mode, thereby a result within the distance measurement ability in each mode is obtained. Accordingly, the distance measuring performance increases, as well as time taken to perform distance measuring operation is shortened.

Below, the effect of the distance measuring method described in the third embodiment is shown using specific values.

When the conditions are given as follows:

Distance between the optical axes of a pair of light-receiving lenses: B

Focal length of each light-receiving lens: fr

Pitch of pixels of the sensor array of the CCD: p

Distance to an object: L, then, the phase difference, PHASE, between a pair of image information is obtained by the following equation;

$$\text{PHASE} = (B \times fr) \div (L \times p) [\text{bit}]$$

When the range which the distance measuring apparatus can measure is ∞ to 300 mm, B=6 mm, fr=10 mm, and p=0.02, then the PHASE, when L is ∞, is, $$\text{PHASE} = 6 \times 10 \div (\infty \times 0.02) \approx 0 [\text{bit}].$$

When L is 300 mm, then $$\text{PHASE} = 6 \times 10 \div (300 \times 0.02) = 10 [\text{bit}].$$

Therefore, correlation values are to be calculated while shifting from 0 to 10 bits to determine the phase difference between the pair of image information.

Further, if the range which the distance measuring apparatus can measure in good precision in the active mode is 300 mm to 3000 mm, and if a range which the distance measuring apparatus can measure in good precision in the passive mode is 2500 mm to ∞, then the start shift amounts SBa, in the active mode, and SBp, in the passive mode, and the end shift amounts SEa, in the active mode, and SEp, in the passive mode, of the shift range for performing correlation operation are, $$SBa = 6 \times 10 \div (3000 \times 0.02) = 1 [\text{bit}]$$

$$SEa = 6 \times 10 \div (300 \times 0.02) = 10 [\text{bit}]$$

$$SBp = 6 \times 10 \div (\infty \times 0.02) \approx 0 [\text{bit}]$$

$$SEp = 6 \times 10 \div (2500 \times 0.02) = 1.2 [\text{bit}] \rightarrow 2 [\text{bit}]$$

Thus, in the active mode, correlation operation is to be performed in the range from 1 to 10 bits, and in the passive mode, correlation operation is to be performed in the range from 0 to 2 bits, to detect the phase difference between a pair of image information. Note that, since image information is shifted by a bit, the calculated result is rounded up to decimal place. In the method as described above, time taken to perform distance measuring operation is shortened, as well as it is possible to improve precision of distance measuring operation since correlation operation in the range where the distance measurement quality drops is omitted.

Further, in a case where contrast of an object has a repeating pattern and when the distance to the object is 10 m, the phase difference between a pair of image information on the light-receiving sensor arrays is, $$\text{PHASE} = 6 \times 10 \div (10000 \times 0.02) = 0.3 [\text{bit}]$$

When calculating a phase difference between the pair of image information in the conventional method, the obtained result depends upon the condition of the contrast and would be 10 bits (closest) in the worst case using the optical system which has the aforesaid configuration. In contrast, by determining the phase difference in the mode suitable for measuring the range which includes the distance to the object, in this case in the passive mode, 2 bits is the maximum phase difference if the phase difference is improperly determined. Accordingly, in the conventional method, there would be a difference between the calculated phase difference and the true phase difference of the maximum of 9.7(=10−0.3) bits; whereas, in the method as described in the third embodiment, 1.7(=2−0.3) bits at most.

According to the third embodiment as described above, by independently determining the shift range subjected to correlation operation between a pair of image information in the active mode and in the passive mode, determination of a phase difference is performed in the mode suitable for measuring the range which includes the distance to the object. Accordingly, time required for the distance measuring operation is shortened, furthermore, wrong distance determination is avoided by omitting correlation operation in the active mode when an object is within a distance range where the active mode is not suitable, and by omitting correlation operation in the passive mode when an object is within a distance range where the passive mode is not suitable. Further, when contrast of an object to be measured has a repeating pattern, the degree of wrong determination in the passive mode is minimized.

Fourth Embodiment

Next, the fourth embodiment of the present invention will be explained with reference to the accompanying drawings.

Figure 18:
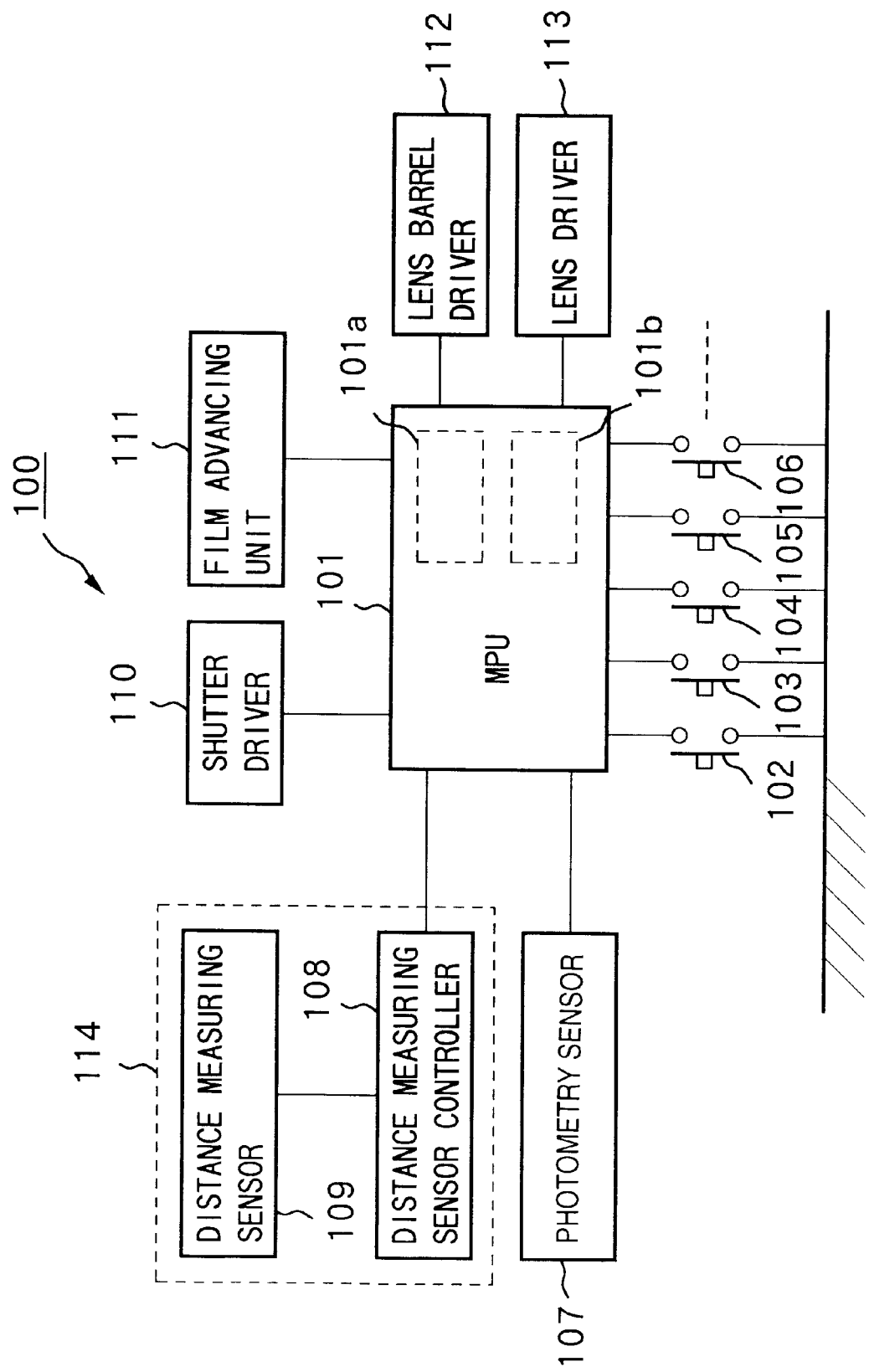
FIG. 18 is a block diagram illustrating a configuration of an image sensing apparatus to which a distance measuring apparatus of the present invention is applied according to a fourth embodiment of the present invention.

FIG. 18 is a block diagram illustrating a configuration of an image sensing apparatus 100 to which a distance measuring apparatus of the present invention is applied.

The image sensing apparatus 100 is a camera having an automatic focusing function, and as shown in FIG. 18, it comprises a microcomputer (MPU) 101, a photometry sensor (ALS) 107, a distance measuring unit 114 including a distance measuring sensor controller (AFC) 108 and a distance measuring sensor (AFS) 109, a shutter driver (SHC) 110, a film advancing unit (FM) 111, a lens barrel driver (ZM) 112, and a lens driver (LM) 113.

The MPU 101 includes memory 101a, having RAM and ROM where program and data for performing various operations are stored, and an operation unit 101b for performing various calculations. By down-loading a program stored in the memory 101a in advance and exciting it, various processes, such as control of the overall operation depending upon outputs from each unit of the camera and operation performed in the operation unit 101b, are realized. As for the memory 101a, semiconductor memory, an optical disk, a magneto-optical disk, and a magnetic medium, for instance, may be used.

Reference numeral 102 denotes a main switch for turning on/off the camera; 103, a tele-switch for moving a lens barrel (not shown) to a telephoto side when the camera is on; 104, a wide-switch for moving the lens barrel to a wide-angle side when the camera is on; and 105, a preparation switch for triggering preparation for image sensing operation when the camera is on. When the preparation switch 105 is turned on, then the preparation for image sensing operation, such as photometry and distance measuring operation, is performed.

Reference numeral 106 denotes the shutter switch. When the shutter switch 106 is turned on which the preparation switch is on, it triggers a series of operation from focus control on the basis of the result of the distance measuring operation to an advancement of the film by a frame.

The on/off states of these switches 102 to 106 are provided to the MPU 101.

The photometry sensor 107, which includes a temperature sensor (not shown), measures external luminance for image sensing operation and outputs a signal corresponding to the external luminance, measured by the temperature sensor, to the MPU 101.

In the distance measuring circuit 114, the distance measuring sensor 109, which will be explained later in detail, includes circulating-type shift registers which operate in two modes, namely, the active mode and the passive mode, and is controlled by the distance measuring sensor controller 108.

The shutter driver 110 controls exposure time by a shutter (not shown) on the basis of an output from the photometry sensor 107 (luminous quantity). The film advancing unit 111 advances a film (not shown) a frame after exposing the frame, and the lens barrel driver 112 moves the lens barrel for changing the focal length in response to on-operation of the tele-switch 3 and the wide-switch 4.

The lens driver 113 moves the lens (not shown) for focusing on an object on the basis of the result of distance measuring operation.

Next, the distance measuring circuit 114 of the image sensing apparatus 100 having the aforesaid configuration is explained with reference to FIG. 19.

The distance measuring method according to the fourth embodiment is a phase-difference detection method for detecting a distance to an object 202 utilizing a principle of trigonometry on the basis of the two signal patterns outputted from sensors.

Figure 19:
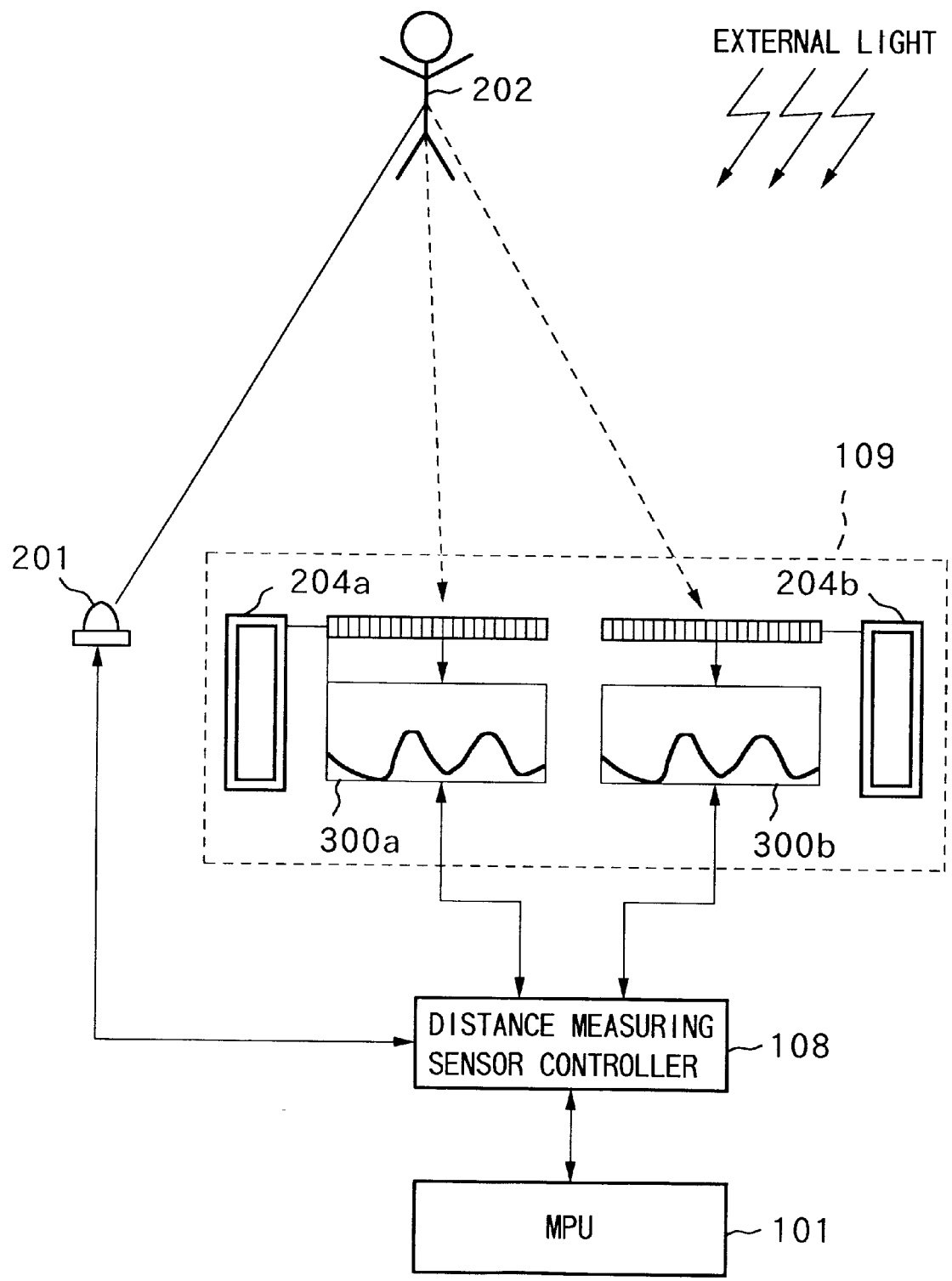
FIG. 19 is a diagram showing a concept of distance measurement and an internal configuration of a distance measuring circuit of the image sensing apparatus shown in FIG. 18.
Figure 21:
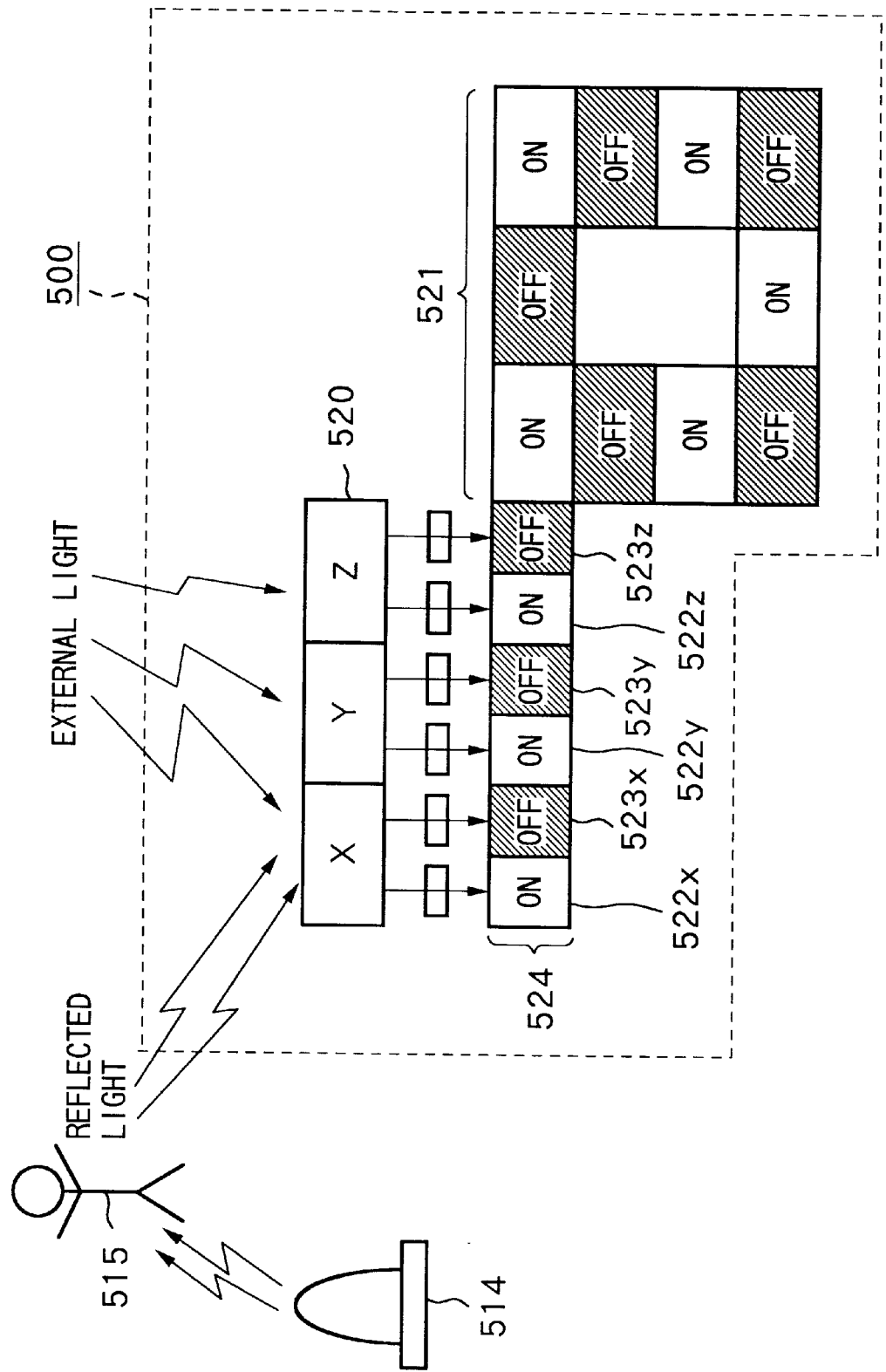
FIG. 21 is a diagram for explaining the principle of a circulating-type shift register.
Figure 22:
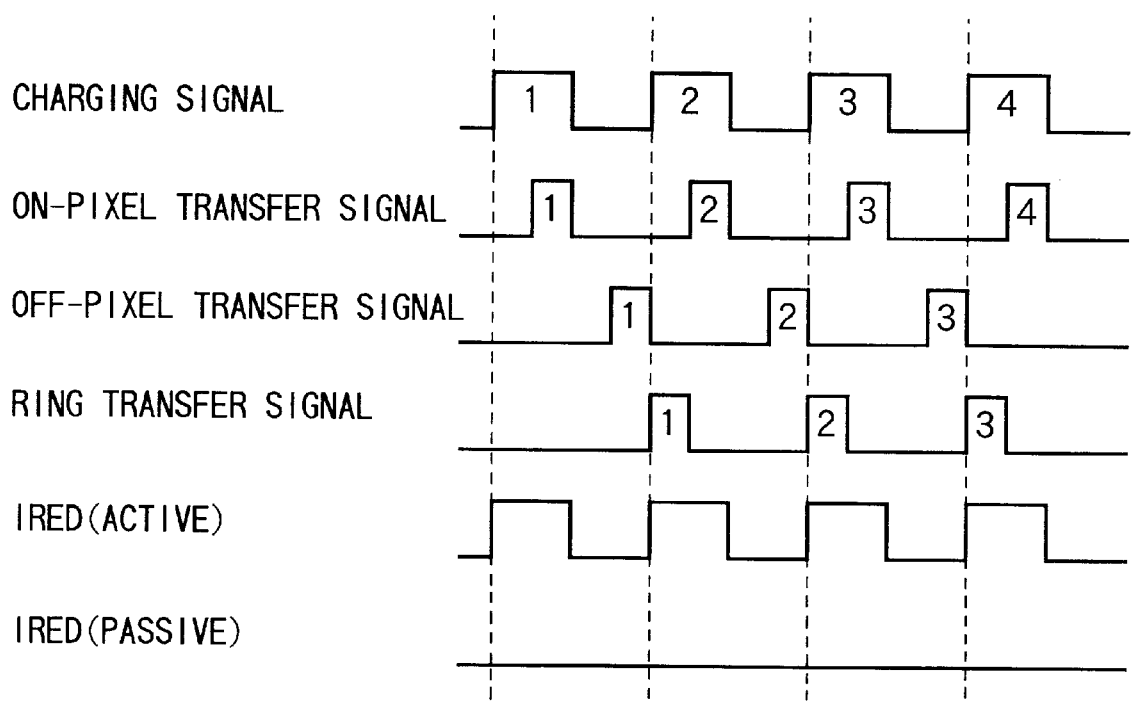
FIG. 22 is a timing chart for explaining charge transference timing in the circulating-type shift register.
Figure 23:
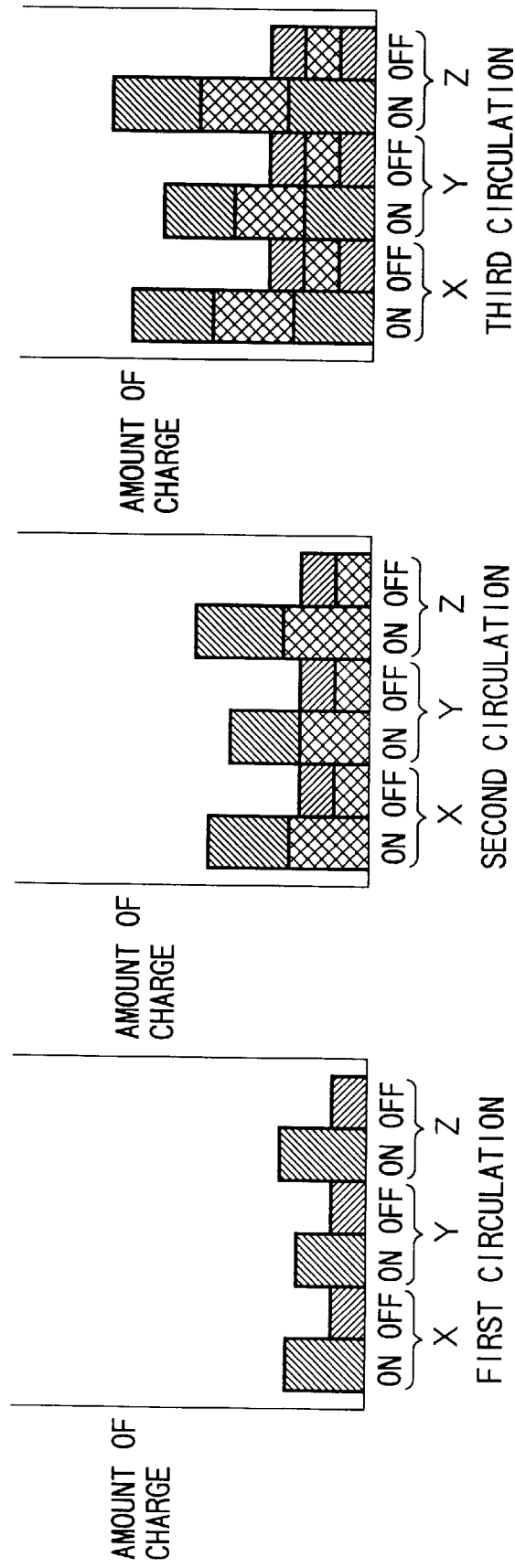
FIGS. 23A to 23C are graphs for explaining states of accumulated charges in response to the number of circulation.

Thus, the distance measuring sensor 109 has two ring CCDs 204a and 204b, as shown in FIG. 19. The ring CCDs 204a and 204b have the same configuration as that of the light-receiving unit 500 explained with reference to FIG. 21.

Accordingly, referring to FIG. 19, the distance measuring sensor 109 receives light, emitted by a light-emitting element 201, such as a light-emitting diode and infrared light-emitting device, and reflected by the object 202, or external light reflected by the object 202, generate charges corresponding to the amount of the received light, and output the charges in response to control by the distance measuring sensor controller 108 on the basis of a mode (active mode or passive mode). In FIG. 19, an example of the outputs from the ring CCDs 204a and 204b are denoted by 300a and 300b, respectively. The outputs 300a and 300b are provided to the MPU 101 via the distance measuring sensor controller 108, and predetermined operations are performed on the basis of the outputs 300a and 300b in the MPU 101, and a distance to the object 202 is obtained as a result.

The distance measuring operation performed by the image sensing apparatus 100 of the fourth embodiment differs from the conventional one when executing automatic focusing function which deals with objects ranging from an object of high reflectance at a short distance to an object of low reflectance in the distance using the distance measuring circuit 114 having the configuration as described above.

Figure 20:
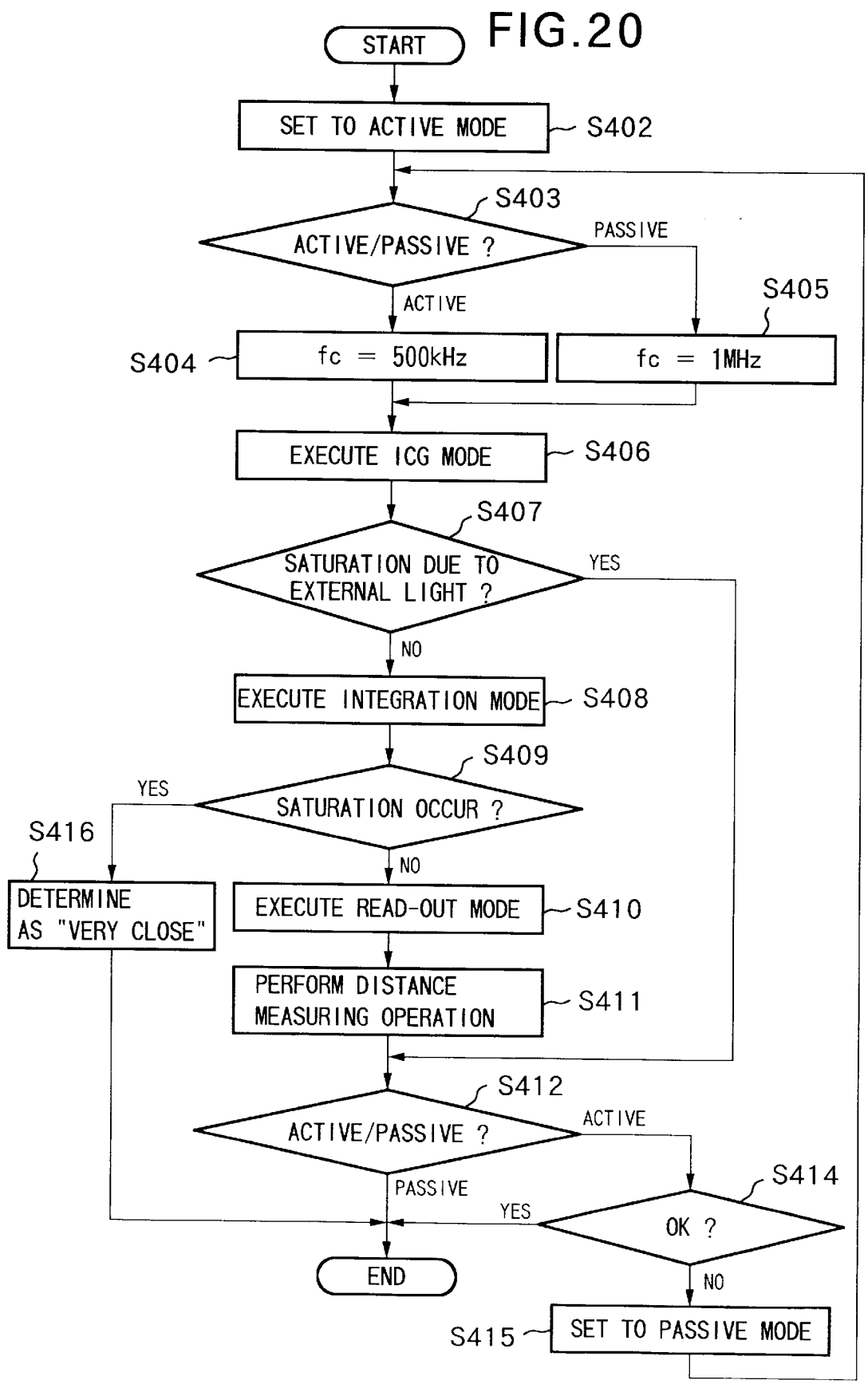
FIG. 20 is a flowchart for explaining distance measuring operation according to the fourth embodiment of the present invention.

FIG. 20 is a flowchart showing distance measuring operation according to the fourth embodiment. A program which realizes the operation as shown in FIG. 20 is stored in the memory 101a of the MPU 101, and by down-loading a program stored in the memory 101a in advance and exciting it by the operation unit 101b, the image sensing apparatus 100 operates as follows.

First, when the automatic focusing (AF) function is activated, the active mode is set in step S402; thereby distance measuring operation is performed in the active mode.

Next, whether the current mode is the active mode or the passive mode is determined in step S403.

If it is determined that the current mode is the active mode in step S403, then the operation frequency fc for operating photoelectric conversion elements of the distance measuring sensor 109 is set to 500 kHz as an initial value in step S404. Whereas, if it is determined that the current mode is the passive mode in step S403, then the operation frequency fc for operating the photoelectric conversion elements is set to 1 MHz as an initial value in step S405.

After setting the initial operation frequency either in step S404 or S405, then ICG (Integration Clear Gate) mode is executed in step S406.

The ICG mode is to determine charging conditions (e.g., setting of electronic shutter and operation frequency) so that any of the OFF-pixels 523x, 523y, and 523z of the ring CCDs 204a and 204b is not saturated by external light while accumulating charges.

Next in step S407, whether or not it is impossible to prevent any of the OFF-pixels 523x, 523y, and 523z from being saturated under the charging conditions determined in step S406 (saturation due to external light) is judged.

For example, if the set value of the electronic shutter is minimum and any of the accumulated charges exceeds a predetermined level within a predetermined number of circulation, then it is determined that the charging period can not be shortened any further by controlling the electronic shutter, and that saturation due to external light occurred.

If it is determined that saturation due to external light occurred in step S407, the process proceeds to step S412, which will be explained later.

Whereas, if it is determined in step S407 that the saturation due to external light did not occur, then the integration mode is executed in step S408. In the integration mode, charges are accumulated in the distance measuring sensor 109.

The period elapsed while accumulating charges (charging period) is known from the number of circulation and the operation frequency fc stored in advance.

After finishing accumulating charges in the ring-shaped CCDs, whether or not any of the ON-pixels 522x, 522y, and 522z is saturated is determined in step S409. This determination is performed in the same manner as described in step S407.

If it is determined that any of the ON-pixels 522x, 522y, and 522z is saturated, the process proceeds to step S416, instead of step S412.

In step S416, the distance measuring operation is determined as not good (NG), and in such case, the result of distance measurement is set to "very close", and the process is completed.

Whereas, if it is determined in step S409 that none of the ON-pixels 522x, 522y, and 522z is saturated, then read-out mode is executed in step S410. The read-out mode is to read out charges accumulated in the ring-shaped CCDs.

The charges read out from the ring-shaped CCD 521 in the read-out mode are provided to the MPU 101 via the distance measuring sensor controller 108. Then, the MPU 101 performs predetermined operation (distance measuring calculation) based on the output from the distance measuring sensor controller 108, thereby obtaining the distance to the object 202 in step S411. Thereafter, the process proceeds to step 412.

In step S412, whether the current mode (distance measuring mode) is the active mode or the passive mode is checked.

If it is determined as the active mode in step S412, then the process proceeds to step S414 where the distance measuring operation has completed normally (OK) or with problem (NG) is determined. In a case where any of the OFF-pixels 523x, 523y, and 523z is determined as saturated in step S407 with external light, then the distance measuring operation is considered as NG, and the passive mode is set in step S415, the process returns to step S403, and the processes subsequent to step S403 are performed again.

Whereas, it is determined in step S614 that the distance measuring operation has completed normally, then the result of distance measuring operation obtained in step S411 is adopted, and the process is completed.

According to the fourth embodiment as described above, in the active mode, in a case where the reflected light from the object is so bright that it causes saturation in any of the ON-pixels 522x to 522z no matter how charging conditions are adjusted so as to avoid the saturation, the distance is determined as "very close"; in contrast the distance measuring operation itself was conventionally determined as not good.

By configuring the distance measuring apparatus as described above, in a case where the result of distance measuring operation is determined as not good in the active mode, it is possible to reduce time taken to perform distance measuring operation comparing to the conventional method in which the distance measuring operation is always performed again in the passive mode. In addition, it is possible to reduce the possibility of obtaining a wrong result.

Note, in the above embodiments, the pair of sensor arrays are configured with CCDs capable of performing skimming operation; however, the present invention is not limited to this, and any sensor can be used as long as it can remove external light components from signals.

Further, in the above embodiments, the present invention is explained when it is applied to a distance measuring apparatus; however, it is also possible to apply the present invention to a focus detecting apparatus.

Further, the object of the present invention can also be achieved by providing a storage medium (in the above embodiments, ROM 14, memory 66 or 101a) storing program codes for performing the aforesaid processes to a computer system or apparatus (e.g., a personal computer), reading the program codes, by a CPU or MPU (in the above embodiments, MPU1, control unit 55 or 65) of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to appraise the public of the scope of the present invention, the following claims are made.

What is claimed is:

1. A image pickup apparatus comprising:
   a light-receiving means, having a plurality of areas, for receiving light from an object and converting the light into electric signals;
   correlation operation means for performing correlation operation on the signals obtained from the plurality of areas of said light-receiving means while shifting at least one of the signals from the plurality of areas; and
   determination means for variably determining a shift range subjected to correlation operation performed by said correlation operation means on the basis of levels of the signals obtained from said light receiving means.

2. The image pickup apparatus according to claim 1, wherein said determination means determines a start value of the shift range.

3. The image pickup apparatus according to claim 1, wherein said determination means determines a start value and an end value of the shift range.

4. The image pickup apparatus according to claim 1, wherein said determination means specifies the shift range by a start value, and a difference between an end value and the start value.

5. A distance measuring apparatus comprising:
- a pair of light-receiving devices for receiving light reflected by an object and converting the light into electric signals;
- correlation operation means for performing correlation operation on the signals obtained from the pair of light-receiving devices while shifting at least one of the signals;
- determination means for variably determining a shift range subjected to correlation operation performed by said correlation operation means; and
- distance calculation means for obtaining a distance to the object on the basis of correlation values obtained as a result of the correlation operation performed by said correlation operation means,
    - wherein said determination means determines the shift range depending upon time taken until a level of a signal obtained from the pair of light-receiving devices is determined to exceed a predetermined level.

6. The distance measuring apparatus according to claim 5, further comprising comparison means for comparing the time measured by said timer to a predetermined period,
- wherein said determination means determines the shift range as a first predetermined range when the time measured by said timer is shorter than the predetermined period, and determines the shift range as a second predetermined range which covers a range corresponding to distance to an object at a farther position than a distance corresponding to a range which is covered by the first predetermined range when the time measured by said timer is equal to or longer than the predetermined period.

7. The distance measuring apparatus according to claim 5, wherein said pair of light-receiving devices respectively have circulating-type shift registers which accumulate signals, obtained from said pairs of light-receiving devices, in units of pixels.

8. The distance measuring apparatus according to claim 7, wherein said light-emitting device emits light pulses, and said circulating-type shift registers accumulate signals in synchronization with the light pulses.

9. The distance measuring apparatus according to claim 8, wherein said timer measures time by counting a number of circulation of said circulating-type shift registers since photoelectric conversion by said pair of light-receiving devices starts until said judging means judges that the level of the signal exceeds the predetermined value.

10. An image pickup apparatus comprising:
- a light-receiving means, having a plurality of areas for receiving light from an object and converting the light into electric signals;
- correlation operation means for performing correlation operation on the signals obtained from the plurality of areas of said light-receiving means while shifting at least one of the signals from the plurality of areas;
- characteristic point extraction means for extracting characteristic points of the signals obtained from said plurality of areas of said light-receiving means, and
- determination means for determining the shift range on the basis of the characteristic points extracted by said characteristic point extraction means.

11. The image pickup apparatus according to claim 10, wherein said characteristic point extraction means detects positions, on said plurality of areas of said light-receiving means, corresponding to rough centers of total values of the signals obtained from said light-receiving means, and said determination means determines the shift range on the basis of a phase difference between the positions corresponding to the rough centers.

12. The image pickup apparatus according to claim 10, wherein said characteristic point extraction means detects positions, on said plurality of areas of said light-receiving means, corresponding to peaks of the signals obtained from said light-receiving means, and said determination means determines the shift range on the basis of a phase difference between the positions corresponding to the peaks.

13. The image pickup apparatus according to claim 10, wherein, when values of the signals obtained from said plurality of areas of said light-receiving means are less than a predetermined level, said determination means is disabled.

14. The image pickup apparatus according to claim 12, wherein, when values of the peaks of the signals obtained from said plurality of areas of said light-receiving means are less than a predetermined value, said determination means is disabled.

15. The image pickup apparatus according to claim 13, wherein the values of the signals are contrast values.

16. The image pickup apparatus according to claim 12, wherein when the positions, on said plurality of areas of said light-receiving means, corresponding to the peaks of the signals are outside of a predetermined range, said determination means is disabled.

17. The image pickup apparatus according to claim 10, further comprising a light-emitting device for projecting light onto the object,
- wherein the distance measuring apparatus operates in a mode of performing correlation operation while projecting light onto the object by said light-emitting device.

18. A distance measuring apparatus comprising:
- a pair of light-receiving devices for receiving light reflected by an object and converting the light into electric signals;
- correlation operation means for performing correlation operation on the signals obtained from the pair of light-receiving devices while shifting at least one of the signals;
- determination means for variably determining a shift range subjected to correlation operation performed by said correlation operation means; and
- distance calculation means for obtaining a distance to the object on the basis of correlation values obtained as a result of the correlation operation performed by said correlation operation means,
    - wherein the distance measuring apparatus is capable of performing distance measuring operation in a plurality of modes, further comprising:
        - mode judging means for judging whether or not the distance measuring apparatus is operating in a first mode or a second mode,
    - wherein said determination means determines the shift range on the basis of the mode judged by said mode judging means.

19. The distance measuring apparatus according to claim 18, further comprising a light-emitting device for projecting light onto the object, wherein the distance measuring apparatus operates while projecting light onto the object by said light-emitting device in said first mode, and operates without projecting light onto the object by said light-emitting device in said second mode.

20. The distance measuring apparatus according to claim 18, wherein the shift range determined by said determination means in the first mode includes a range where distance measurement is not performed with high accuracy in the second mode.

21. The distance measuring apparatus according to claim 18, wherein the shift range determined by said determination means in the first mode covers a range corresponding to a distance to an object at a closer position than a distance corresponding to a range which is covered by the shift range in the second mode.

22. The distance measuring apparatus according to claim 18, wherein the shift range determined by said determination means in the second mode covers a range corresponding to a distance to an object at a farther position than a distance corresponding to a range which is covered by the shift range in the first mode.

23. The image pickup apparatus according to claim 1, wherein said plurality of areas of said light-receiving means respectively have circulating-type shift registers which accumulate signals, obtained from said plurality of areas of said light-receiving means, in units of pixels.

24. A focus control apparatus which includes a distance measuring apparatus capable of performing distance measuring operation in a plurality of modes, comprising:
   a pair of light-receiving devices for receiving light reflected by an object and converting the light into electric signals;
   correlation operation means for performing correlation operation on the signals obtained from the pair of light-receiving devices while shifting at least one of the signals;
   determination means for variably determining a shift range subjected to correlation operation performed by said correlation operation means;
   distance calculation means for obtaining a distance to the object on the basis of correlation values obtained as a result of the correlation operation performed by said correlation operation means;
   mode judging means for judging whether or not the distance measuring apparatus is operating in a first mode or a second mode;
   a focus lens for focusing on the object; and
   a driver for driving said focus lens on the basis of the distance obtained by said distance calculation means, wherein said determination means determines the shift range on the basis of the mode judged by said mode judging means.

25. A distance measuring apparatus comprising:
   a pair of light-receiving devices for receiving light reflected by an object and converting the light into electric signals;
   correlation operation means for performing correlation operation on the signals obtained from the pair of light-receiving devices while shifting at least one of the signals;
   a light-emitting device for projecting light onto the object;
   mode judging means for judging whether a first mode in which distance measuring operation is performed while operating said light-emitting device or a second mode in which the distance measuring operation is performed without operating said light-emitting device is set;
   saturation judging means for judging whether or not saturation state due to the operation of said light-emitting device has occurred in said first mode has occurred; and
   distance determining means for variably determining a distance to the object as a predetermined distance when said saturation judging means judges that the saturation state has occurred.

26. The distance measuring apparatus according to claim 25, wherein the predetermined distance is set to a distance equal to or less than a shortest distance where the distance measuring apparatus can measure.

27. The distance measuring apparatus according to claim 25, wherein said pair of light-receiving devices respectively have circulating-type shift registers which accumulate signals, obtained from said pair of light-receiving devices, in units of pixels.

28. The distance measuring apparatus according to claim 27, wherein said light-emitting device emits light pulses, and said circulating-type shift registers accumulate signals in synchronization with the light pulses in said first mode.

29. The distance measuring apparatus according to claim 28, further comprising:
   judging means for judging whether or not a level of the signal obtained from said pair of light-receiving devices exceeds a first predetermined value;
   a counter for counting a number of circulation of said circulating-type shift registers since photoelectric conversion by said pair of light-receiving devices starts until said judging means judges that the level of the signal exceeds the first predetermined value; and
   comparison means for comparing the number of circulation counted by said counter to a second predetermined value and determining whether or not the number exceeds the second predetermined value,
      wherein said saturation judging means judges that the saturation state due to the operation of said light-emitting device has occurred in a case where the number of circulation is less than the second predetermined value.

30. A focus adjusting apparatus comprising:
   a pair of light-receiving devices for receiving light reflected by an object and converting the light into electric signals;
   correlation operation means for performing correlation operation on the signals obtained from the pair of light-receiving devices while shifting at least one of the signals;
   a light-emitting device for projecting light onto the object;
   mode judging means for judging whether a first mode in which distance measuring operation is performed while operating said light-emitting device or a second mode in which the distance measuring operation is performed without operating said light-emitting device is set;
   saturation judging means for judging whether or not saturation state due to the operation of said light-emitting device has occurred in said first mode has occurred; and
   distance determining means for variably determining a distance to the object as a predetermined distance when said saturation judging means judges that the saturation state has occurred;
   a focus lens for focusing on the object; and a driver for driving said focus lens on the basis of the distance obtained by said distance calculation means.

31. An image pickup method comprising:
a step of receiving light from an object and converting the light into electric signals using a light receiving means having a plurality of areas;
a correlation operation step of performing correlation operation on the signals obtained from the plurality of areas of said light-receiving means while shifting at least one of the signals from the plurality of areas; and
a determination step of variably determining a shift range subjected to correlation operation to be performed in said correlation operation step on the basis of levels of the signals obtained from said light-receiving means.

32. The image pickup method according to claim 31, wherein, in said determination step, a start value of the shift range is determined.

33. The image pickup method according to claim 31, wherein, in said determination step, a start value and an end value of the shift range are determined.

34. The image pickup method according to claim 31, wherein, in said determination step, the shift range is specified by a start value, and a difference between an end value and the start value.

35. A distance measuring method comprising:
a step of receiving light reflected by an object and converting the light into electric signals using a pair of light-receiving devices;
a correlation operation step of performing correlation operation on the signals obtained from the pair of light-receiving devices while shifting at least one of the signals;
a determination step of variably determining a shift range subjected to correlation operation to be performed in said correlation operation step; and
a distance calculation step of obtaining a distance to the object on the basis of correlation values obtained as a result of the correlation operation performed in said correlation operation step,
wherein in said determination step the shift range is determined depending upon time taken until a level of a signal obtained from the pair of light-receiving devices is determined to exceed a predetermined level.

36. The distance measuring method according to claim 35, further comprising a comparison step of comparing the time measured in said time measuring step to a predetermined period,
wherein, in said determination step, the shift range is determined as a first predetermined range when the time measured in said time measuring step is shorter than the predetermined period, and the shift range is determined as a second predetermined range which covers a range corresponding to a distance to an object at a farther position than a distance corresponding to a range which is covered by the first predetermined range when the time measured in said time measuring step is equal to or longer than the predetermined period.

37. The distance measuring method according to claim 35, wherein said pair of light-receiving devices respectively have circulating-type shift registers, and further comprises an accumulating step of accumulating signals, obtained from said pairs of light-receiving devices, in units of pixels by said circulating-type shift registers.

38. The distance measuring method according to claim 37, wherein, in said light-emitting step, light pulses are emitted, and, in said accumulating step, signals are accumulate in synchronization with the light pulses.

39. The distance measuring method according to claim 38, wherein, in said time measuring step, time is measured by counting a number of circulation of said circulating-type shift registers since photoelectric conversion in said pair of light-receiving devices starts until the level of the signal is judged that the level exceeds the predetermined value in said judging step.

40. An image pickup method comprising:
a step of receiving light from an object and converting the light into electric signals using a light-receiving means having a plurality of areas;
a correlation operation step of performing correlation operation on the signals obtained from the plurality of areas of said light-receiving means while shifting at least one of the signals from the plurality of areas;
a characteristic point extraction step of extracting characteristic points of the signals obtained from said light-receiving means; and
a determination step of determining the shift range on the basis of the characteristic points extracted in said characteristic point extraction step.

41. The image pickup method according to claim 40, wherein, in said characteristic point extraction step, positions, on said plurality of areas of said light-receiving means, corresponding to rough centers of total values of the signals obtained from said light-receiving means are detected, and, in said determination step, the shift range is determined on the basis of a phase difference between the positions corresponding to the rough centers.

42. The image pickup method according to claim 40, wherein, in said characteristic point extraction step, positions, on said plurality of areas of said light-receiving means, corresponding to peaks of the signals obtained from said pair of light-receiving means are detected, and, in said determination step, the shift range is determined on the basis of a phase difference between the positions corresponding to the peaks.

43. The image pickup method according to claim 40, wherein, when values of the signals obtained from said plurality of areas of said light-receiving means are less than a predetermined level, said determination step is disabled.

44. The image pickup method according to claim 42, wherein, when values of the peaks of the signals obtained from said plurality of areas of said light-receiving means are less than a predetermined value, said determination step is disabled.

45. The image pickup method according to claim 43, wherein the values of the signals are contrast values.

46. The image pickup method according to claim 42, wherein when the positions, on said plurality of areas of said light-receiving means, corresponding to the peaks of the signals are outside of a predetermined range, said determination step is disabled.

47. The image pickup method according to claim 40, further comprising a light-emitting step of projecting light onto the object,
wherein the distance measuring method operates in a mode of performing correlation operation while projecting light onto the object in said light-emitting step.

48. A distance measuring method comprising:
a step of receiving light reflected by an object and converting the light into electric signals using a pair of light-receiving devices;
a correlation operation step of performance correlation operation on the signals obtained from the pair of light-receiving devices while shifting at least one of the signals;

a determination step of variably determining a shift range subjected to correlation operation to be performed in said correlation operation step; and a distance calculation step of obtaining a distance to the object on the basis of correlation values obtained as a result of the correlation operation performed in said correlation operation step; and a mode judging step of judging whether or not the distance measuring method is operating in a first mode or a second mode, wherein, in said determination step, the shift range is determined on the basis of the mode judged in said mode judging step.

49. The distance measuring apparatus according to claim 48, further comprising a light-emitting step of projecting light onto the object, wherein the distance measuring method operates while projecting light onto the object in said light-emitting step in said first mode, and operates without projecting light onto the object by disabling said light-emitting step in said second mode.

50. The distance measuring method according to claim 48, wherein the shift range determined in said determination step in the first mode includes a range where distance measurement is not performed with high accuracy in the second mode.

51. The distance measuring method according to claim 48, wherein the shift range determined in said determination step in the first mode covers a range corresponding to a distance to an object at a closer position than a distance corresponding to a range which is covered by the shift range in the second mode.

52. The distance measuring method according to claim 48, wherein the shift range determined in said determination step in the second mode covers a range corresponding to a distance to an object at a farther position than a distance corresponding to a range which is covered by the shift range in the first mode.

53. The image pickup method according to claim 31, wherein said plurality of areas of said light-receiving means respectively have circulating-type shift registers, and further comprises an accumulating step of accumulating signals, obtained from said plurality of areas of said light-receiving means, in units of pixels by said circulating-type shift registers.

54. A focus adjusting method capable of operating in a plurality of modes, comprising:

a step of receiving light reflected by an object and converting the light into electric signals using a pair of light-receiving devices;

a correlation operation step of performing correlation operation on the signals obtained from the pair of light-receiving devices while shifting at least one of the signals;

a determination step of variably determining a shift range subjected to correlation operation to be performed in said correlation operation step;

a distance calculation step of obtaining a distance to the object on the basis of correlation values obtained as a result of the correlation operation performed in said correlation operation step;

a mode judging step of judging whether or not the distance measuring method is operating in a first mode or a second mode; and a focus control step of focusing on the object on the basis of the distance obtained in said distance calculation step, wherein, in said determination step, the shift range is determined on the basis of the mode judged in said mode judging step.

55. A distance measuring method comprising:

a step of receiving light reflected by an object and converting the light into electric signals using a pair of light-receiving devices;

a correlation operation step of performing correlation operation on the signals obtained from the pair of light-receiving devices while shifting at least one of the signals;

a light-emitting step of projecting light onto the object;

a mode judging step of judging whether a first mode in which distance measuring operation is performed while activating said light-emitting step or a second mode in which the distance measuring operation is performed while disabling said light-emitting step is set;

a saturation judging step of judging whether or not saturation state due to the operation of said light-emitting step has occurred in said first mode has occurred; and a distance determining step of variably determining a distance to the object as a predetermined distance when it is judged in said saturation judging step that the saturation state has occurred.

56. The distance measuring method according to claim 55, wherein the predetermined distance is set to a distance equal to or less than a shortest distance where the distance measuring method can measure.

57. The distance measuring method according to claim 55, wherein said pair of light-receiving devices respectively have circulating-type shift registers, and further comprises an accumulating step of accumulating signals, obtained from said pairs of light-receiving devices, in units of pixels by said circulating-type shift registers.

58. The distance measuring method according to claim 57, wherein, in said light-emitting step, light pulses are emitted, and, in said accumulating step, signals are accumulated in synchronization with the light pulses in said first mode.

59. The distance measuring method according to claim 58, further comprising:

a judging step of judging whether or not a level of the signal obtained from said pair of light-receiving devices exceeds a first predetermined value;

a counting step of counting a number of circulation of said circulating-type shift registers since photoelectric conversion in said pair of light-receiving devices starts until the level of the signal is judged that the level exceeds the first predetermined value in said judging step; and a comparison step of comparing the number of circulation counted in said counting step to a second predetermined value and determining whether or not the number exceeds the second predetermined value, wherein, in said saturation judging step, it is judged that the saturation state due to the operation of said light-emitting device has occurred in a case where the number of circulation is less than the second predetermined value.

60. A focus adjusting method comprising:

a step of receiving light reflected by an object and converting the light into electric signals using a pair of light-receiving devices;

a correlation operation step of performing correlation operation on the signals obtained from the pair of light-receiving devices while shifting at least one of the signals;

a light-emitting step of projecting light onto the object;

a mode judging step of judging whether a first mode in which distance measuring operation is performed while activating said light-emitting step or a second mode in which the distance measuring operation is performed while disabling said light-emitting step is set;

a saturation judging step of judging whether or not saturation state due to the operation of said light-emitting step has occurred in said first mode has occurred;

a distance determining step of variably determining a distance to the object as a predetermined distance when it is judged in said saturation judging step that the saturation state has occurred; and a focus control step of focusing on the object on the basis of the distance obtained in said distance calculation step.

61. A computer program product comprising a computer usable medium having computer readable program code means embodied in said medium for an image pickup method, said product including:

first computer readable program code means for receiving light from the object and converting the light into electric signals using a light-receiving means having a plurality of areas;

second computer readable program code means for performing correlation operation on the signals obtained from the plurality of areas of said light-receiving means while shifting at least one of the signals from the plurality of areas; and third computer readable program code means for variably determining a shift range subjected to correlation operation to be performed on the basis of levels of the signals obtained from said light receiving means.

* * * * *

UNITED STATES PATENT AND TRADEMARK OFFICE
CERTIFICATE OF CORRECTION

PATENT NO.    : 6,173,122 B1                                              Page 1 of 1
DATED         : January 9, 2001
INVENTOR(S)   : Yukihiro Matsumoto, Osamu Harada It is certified that error appears in the above-identified patent and that said Letters Patent is hereby corrected as shown below:

Column 7,
Line 40, please align right and add -- ...(1) --.

Signed and Sealed this

Twelfth Day of March, 2002

Attest:

Attesting Officer

JAMES E. ROGAN
Director of the United States Patent and Trademark Office